United States Patent
Nishibayashi et al.

(10) Patent No.: US 7,697,561 B2
(45) Date of Patent: Apr. 13, 2010

(54) COMMUNICATION APPARATUS, COMMUNICATION METHOD, AND COMMUNICATION SYSTEM

(75) Inventors: Yasuyuki Nishibayashi, Kawasaki (JP); Masahiro Takagi, Tokyo (JP); Tomoko Adachi, Urayasu (JP); Tetsu Nakajima, Yokohama (JP); Yoriko Utsunomiya, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1311 days.

(21) Appl. No.: 11/068,857

(22) Filed: Mar. 2, 2005

(65) Prior Publication Data

US 2005/0195858 A1 Sep. 8, 2005

(30) Foreign Application Priority Data

Mar. 5, 2004 (JP) .............................. 2004-063237

(51) Int. Cl.
*H04L 12/413* (2006.01)

(52) U.S. Cl. ...................................... 370/445; 370/392

(58) Field of Classification Search ........................ None
See application file for complete search history.

(56) References Cited

U.S. PATENT DOCUMENTS

| | | | |
|---|---|---|---|
| 2003/0135640 A1* | 7/2003 | Ho et al. ..................... 709/237 |
| 2003/0169769 A1 | 9/2003 | Ho et al. |
| 2004/0008690 A1* | 1/2004 | Kandala ................. 370/395.21 |
| 2004/0066763 A1* | 4/2004 | Hashimoto et al. ........... 370/329 |
| 2005/0135416 A1* | 6/2005 | Ketchum et al. ............. 370/469 |
| 2005/0141548 A1* | 6/2005 | Koo et al. .................... 370/462 |
| 2005/0195858 A1 | 9/2005 | Nishibayashi et al. |
| 2006/0198325 A1* | 9/2006 | Gao et al. .................... 370/270 |

FOREIGN PATENT DOCUMENTS

| | | |
|---|---|---|
| JP | 3-114334 | 5/1991 |
| JP | 2000-244461 | 9/2000 |
| JP | 2002-232512 | 8/2002 |
| JP | 2002-237794 | 8/2002 |
| JP | 2002-314546 | 10/2002 |
| JP | 2003-60645 | 2/2003 |
| JP | 2003-324442 | 11/2003 |
| JP | 2003-324445 | 11/2003 |
| JP | 2004-7336 | 1/2004 |
| WO | WO 00/02395 | 1/2000 |
| WO | WO 02/103943 A1 | 12/2002 |

(Continued)

OTHER PUBLICATIONS

U.S. Appl. No. 11/525,994, filed Sep. 25, 2006, Nishibayashi et al.

(Continued)

*Primary Examiner*—Phirin Sam
(74) *Attorney, Agent, or Firm*—Oblon, Spivak, McClelland, Maier & Neustadt, L.L.P.

(57) ABSTRACT

A communication apparatus includes a frame generating device configured to generate a physical frame containing, of a plurality of MAC frames to be transmitted, a MAC frame which requires acknowledgement indicating that the frame is received by a receiving side, a MAC frame which does not require the acknowledgement, and identification information which indicates necessity/unnecessity of acknowledgement for each MAC frame depending on whether each MAC frame requires acknowledgement, and a transmitting device configured to transmit the physical frame generated by the frame generating device.

9 Claims, 27 Drawing Sheets

FOREIGN PATENT DOCUMENTS

| | | |
|---|---|---|
| WO | WO 03/039074 A1 | 5/2003 |
| WO | WO 03/043266 A1 | 5/2003 |
| WO | WO 03/061204 A1 | 7/2003 |

OTHER PUBLICATIONS

U.S. Appl. No. 11/853,437, filed Sep. 11, 2007, Hirano et al.
U.S. Appl. No. 12/054,945, filed Mar. 25, 2008, Nishibayashi et al.
Jean Lorchat, Thomas Noel, Energy Saving in IEEE 802.11 Communications using Frame Aggregation, Global Telecommunications Conference, 2003. Globecom '03. IEEE, Dec. 5, 2003, vol. 3, pp. 1296-1300.
U.S. Appl. No. 11/029,544, filed Jan. 6, 2005, Takagi et al.
U.S. Appl. No. 11/068,857, Mar. 2, 2005, Nishibayashi et al.
U.S. Appl. No. 11/068,857, filed Mar. 2, 2005, Nishibayashi et al.
U.S. Appl. No. 11/087,763, filed Mar. 24, 2005, Nishibayashi et al.
U.S. Appl. No. 11/068,857, filed Mar. 2, 2005, Nishibayashi et al.
U.S. Appl. No. 11/110,936, filed Apr. 21, 2005, Nishibayashi et al.
U.S. Appl. No. 11/068,857, filed Mar. 2, 2005, Nishibayashi, et al.
U.S. Appl. No. 11/135,358, filed May 24, 2005, Nakajima, et al.
U.S. Appl. No. 11/200,103, filed Aug. 10, 2005, Nishibayashi et al.

\* cited by examiner

| Bit 2 | Bit 3 | Usage |
|---|---|---|
| 0 | 0 | Normal IEEE 802.11®acknowledgement 〜900<br>The addressed recipient returns an ACK or QoS (+) CF-Ack frame after a SIFS period, according to the procedures defined in 9.2.8, 9.3.3 and 9.9.2.3. |
| 1 | 0 | No acknowledgement 〜901<br>The recipient(s) do not acknowledge the transmission. |
| 0 | 1 | Partial acknowledgement 〜902 |
| 1 | 1 | Block Acknowledgement 〜903<br>A separate Block Ack set up mechanism described in 9.10 is used. |

FIG. 9

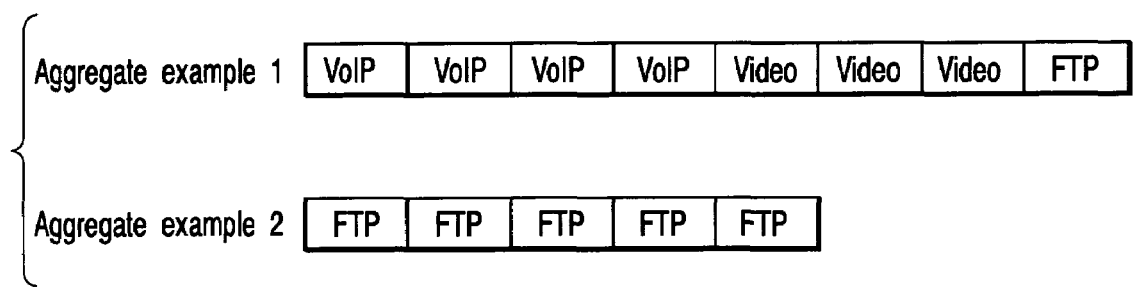
F I G. 17

FIG. 21A  ADDTS Request

| Order | Information |
|---|---|
| 1 | Category |
| 2 | Action |
| 3 | Dialog Token |
| 4 | TSPEC |
| 5-n | TCLAS (optional) |
| n+1 | TCLAS Processing (optional) |

FIG. 21B  ADDTS Response

| Order | Information |
|---|---|
| 1 | Category |
| 2 | Action |
| 3 | Dialog Token |
| 4 | Status Code |
| 5 | TS Delay |
| 6 | TSPEC |
| 7-n | TCLAS (optional) |
| n+1 | TCLAS Processing (optional) |
| n+2 | Schedule |

COMMUNICATION APPARATUS, COMMUNICATION METHOD, AND COMMUNICATION SYSTEM

CROSS-REFERENCE TO RELATED APPLICATIONS

This application is based upon and claims the benefit of priority from prior Japanese Patent Application No. 2004-063237, filed Mar. 5, 2004, the entire contents of which are incorporated herein by reference.

BACKGROUND OF THE INVENTION

1. Field of the Invention

The present invention relates a communication apparatus, communication method, and communication system which perform media access control and, more particularly, to access control for improving quality of service (QoS).

2. Description of the Related Art

Media access control (MAC) is control for causing a plurality of communication apparatuses which perform communication while sharing the same medium to decide how to use the medium in transmitting communication data or management frame. Owing to media access control, even if two or more communication apparatuses transmit communication data (or management frame) by using the same medium at the same time, there is less chance of the occurrence of a phenomenon (collision) in which a communication apparatus on the receiving side cannot decode communication data. The fundamental access method of the IEEE802.11 MAC is CSMA/CA (Carrier Sense Multiple Access with Collision Avoidance). The CSMA/CA is designed to reduce the collision probability. Media access control is also a technique for controlling access from communication apparatuses to a medium so as to minimize the chance of the occurrence of a phenomenon in which, despite the presence of communication apparatuses having transmission requests, the medium is not used by any of the communication apparatuses.

In addition, several access control techniques designed to improve quality of service (QoS) are also known. For example, there is available HCCA (HCF Controlled Access) which is an extended technique of a conventional polling sequence and is used as a QoS technique of guaranteeing parameters such as a designated bandwidth and delay time. According to HCCA, in order to guarantee parameters such as bandwidth and delay time, QAP (QoS Access Point) performs bandwidth management including allocation of transmission opportunity to QSTA (QoS Station). QAP is also known as HC (Hybrid Coordinator) in IEEE802.11e standard.

Jpn. Pat. Appln. KOKAI Publication No. 2002-314546 discloses a method of assigning priorities to communications between wireless network stations, while referring to QoS in the IEEE 802.11e standard.

According to conventional HCCA, quality can be guaranteed for each traffic stream, and data transmission corresponding to priority can be realized. A Traffic Stream is a set of MSDU (MAC Service Data Unit) s to be delivered subject to the QoS parameter values provided to the MAC in a particular traffic specification. Traffic Streams are only meaningful to MAC entities that support QoS within the MAC data service. Such QoS is also preferably used in a new communication scheme in which a further increase in throughput is achieved. For example, QoS is preferably used for frame aggregation designed to improve the transmission efficiency by transmitting a plurality of MAC frames upon containing them in one PHY (physical) frame. If, however, a conventional frame aggregation technique is simply applied to QoS like HCCA, the following problems arise.

According to the conventional frame aggregation technique, since no consideration is given to the priorities of frames, when a series of frames in a transmission queue (TxQ) are aggregation target frames, an FTP (File Transfer Protocol) frame with a relatively low priority may be extracted before a VoIP (Voice over IP) frame with a high priority and aggregated to a transmission aggregation frame. This may hinder the assurance of QoS in consideration of the priorities of frames.

In addition, the frame aggregation technique using a selective repeat retransmission needs to be in combination with an acknowledgement sequence (e.g., a "No acknowledgement") unique to IEEE802.11e standard.

BRIEF SUMMARY OF THE INVENTION

The present invention is directed to provide a communication apparatus, communication method, and communication system which can increase throughput by aggregating multiple (a plurality of) MAC frames while maintaining the service quality (QoS) of communication.

A communication apparatus according to an aspect of the present invention includes a frame generating device configured to generate a physical frame containing, of a plurality of MAC frames to be transmitted, a MAC frame which requires the reception status of acknowledgement frame from a receiving side, a MAC frame which does not require the acknowledgement, and identification information which indicates necessity/unnecessity of acknowledgement for each MAC frame, and a transmitting device configured to transmit the physical frame generated by the frame generating device.

BRIEF DESCRIPTION OF THE SEVERAL VIEWS OF THE DRAWING

FIG. 9 is a view showing the contents of an Ack policy field;

FIG. 17 is a view showing frame aggregate examples 1 and 2 for each priority;

FIGS. 21A and 21B are views respectively showing ADDTS Request (request) and ADDTS Response (response);

DETAILED DESCRIPTION OF THE INVENTION

The embodiments of the present invention will be described with reference to the views of the accompanying drawing.

Figure 1:
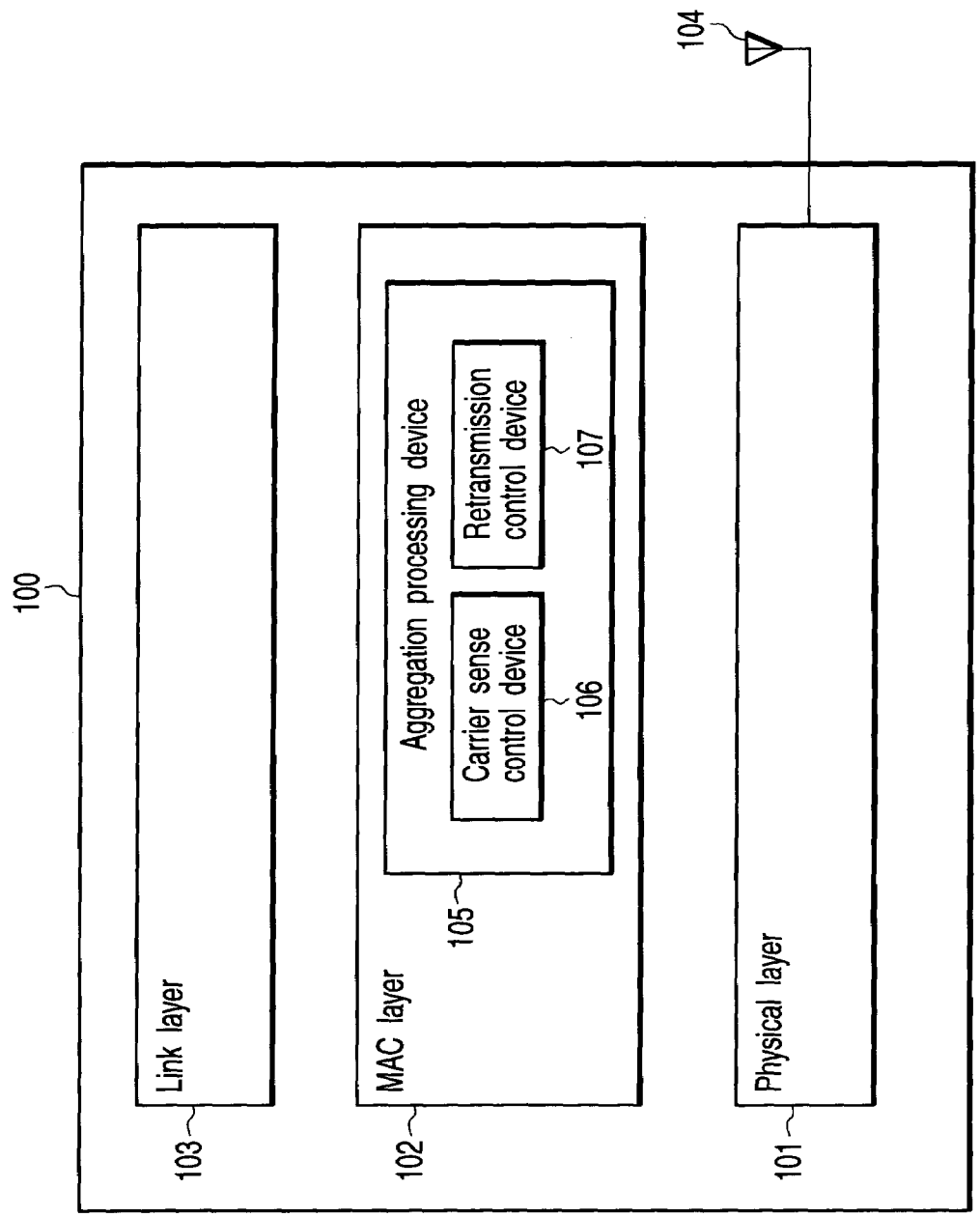
FIG. 1 is a block diagram showing the arrangement of a communication apparatus according to an embodiment of the present invention.

FIG. 1 is a block diagram showing a communication apparatus according to an embodiment of the present invention. A communication apparatus 100 is an apparatus configured to communicate with another communication apparatus through a wireless link, and includes processing units 101, 102, and 103 respectively corresponding to a physical layer, MAC layer, and link layer. These processing units are implemented as analog or digital electronic circuits or as firmware or the like to be executed by a CPU incorporated in an LSI in accordance with implementation requirements. An antenna 104 is connected to the physical layer processing unit ("processing unit" will be omitted hereinafter) 101. The MAC layer 102 includes an aggregation processing device 105 according to the present invention. The aggregation processing device 105 includes a carrier sense control device 106 and retransmission control device 107.

Figure 2:
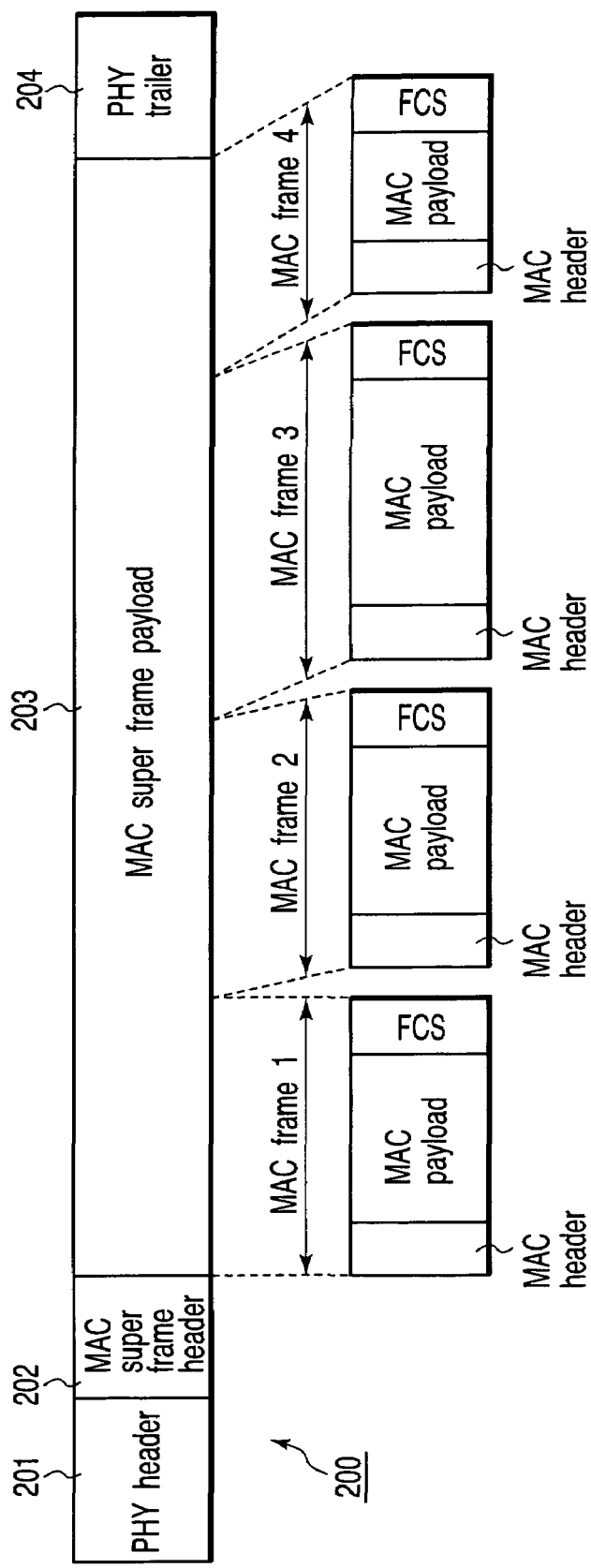
FIG. 2 is a view showing an example of a frame format used by the communication apparatus according to an embodiment of the present invention.

FIG. 2 is a view showing an example of the frame format used by the communication apparatus according to an embodiment of the present invention. A frame format 200 schematically shows a frame structure associated with a physical layer and MAC layer. More specifically, this format is assumed to be one that conforms to IEEE 802.11 or an extended version thereof. As shown in FIG. 2, the frame format 200 is comprised of a PHY header 201, MAC super frame header 202, MAC super frame payload 203, and PHY trailer 204. The MAC super frame header 202 and MAC super frame payload 203 correspond to a PHY payload (to be described later). The PHY header 201 is processed by the physical layer 101 of the receiving communication apparatus. That is, the physical layer 101 performs detection of a frame head, carrier sense, timing synchronization establishment, automatic gain control (AGC) of an amplifier, tracking a transmitting-side carrier frequency (automatic frequency control), transmission channel estimation, and the like. The physical layer 101 also detects the modulation scheme and coding ratio of the PHY payload following the PHY header 201, a transmission rate, and a data length.

In this description, a communication scheme for improving the transfer efficiency by containing multiple (a plurality of) MAC frames in one frame format 200 as shown in FIG. 2 will be referred to as "frame aggregation". Frame aggregation is suitable for the next-generation high-throughput wireless LAN communication (IEEE 802.11n standard) which is currently being standardized.

The first to third embodiments of the present invention which will be described below are directed to QoS when frame aggregation is executed. QoS to be described in each embodiment is assumed to be HCCA which guarantees given quality for each traffic stream.

The first embodiment will exemplify frame retransmission control associated with communication quality and communication sequences for various kinds of response policy (Ack Policy).

Figure 3:
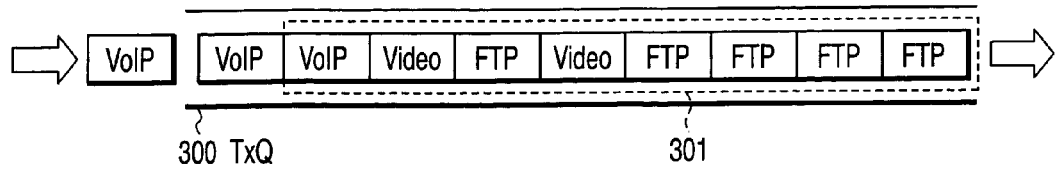
FIG. 3 is a view for explaining frame aggregation without consideration to priority.

Conventionally, in the frame aggregation scheme, no priority processing is performed for each flow (application traffic) directed to each destination. When, for example, as shown in FIG. 3, a series of frames 301 in a transmission queue (TxQ) 300 are aggregation target frames, an FTP (File Transfer Protocol) frame with a relatively low priority is sometimes aggregated preferentially over a VoIP (Voice over IP) frame with a high priority. In the second embodiment, in order to prevent any frames with low priorities from being transmitted before frames with high priorities due to the execution of simple frame aggregation method, frame positions at which frames to be aggregated are stored are sorted according to priority. The third embodiment will exemplify a case wherein when a frame having undergone a reception error is to be retransmitted, suitable sliding window control is executed in QoS based on the HCCA scheme. The fourth embodiment is directed to the aggregation of Block Ack frames (control frames which are defined in IEEE802.11e standard) associated with QoS.

Figure 4:
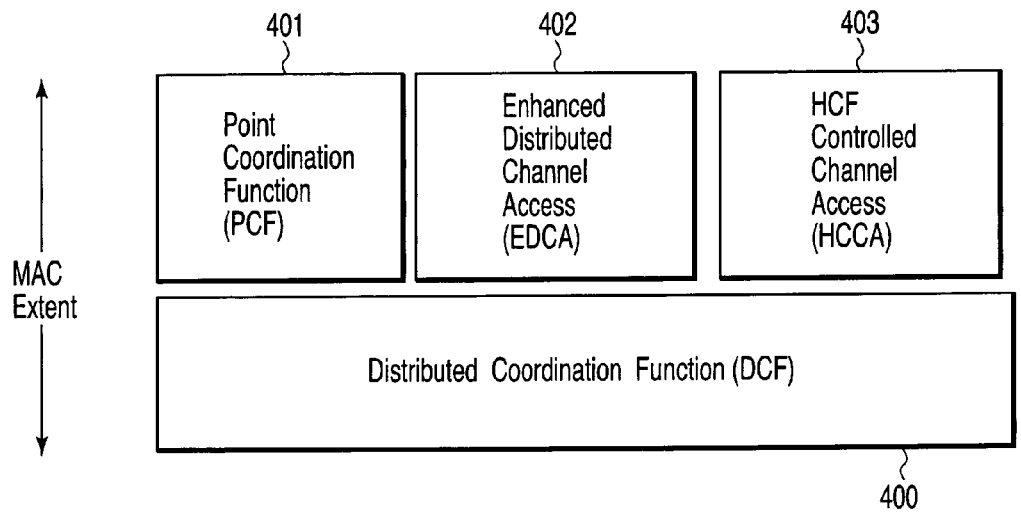
FIG. 4 is a view showing the types of QoS in the IEEE 802.11e standard.

FIG. 4 is a view showing the types of QoS in the IEEE 802.11e standard. QoS in the IEEE 802.11e standard includes DCF (Distributed Coordination Function) 400, PCF (Point Coordination Function) 401, EDCA (Enhanced Distributed Channel Access) 402, and HCCA (HCF Controlled Channel Access) 403. In the DCF 400, a transmitting STA senses a wireless medium to determine whether any other STA is transmitting, thereby deciding, in accordance with the state of use of the wireless medium, whether or not to transmit a frame. In this case, a carrier sense time is the sum of an IFS (Inter Frame Space) time and a random backoff time. In the PCF 401, an AP (Access Point) serves as a base station which performs polling for centralized control on wireless terminals. The AP sequentially polls terminals on the basis of a polling list. An STA transmits a frame after it receives a poll frame. The prioritized EDCA 402 is a contention-base QoS scheme, in which multiple (a plurality of) ACs (Access Categories) are provided for the respective priorities to perform CSMA/CA procedure in parallel. The HCCA 403 is an extended scheme of conventional PCF for polling control.

Figure 5:
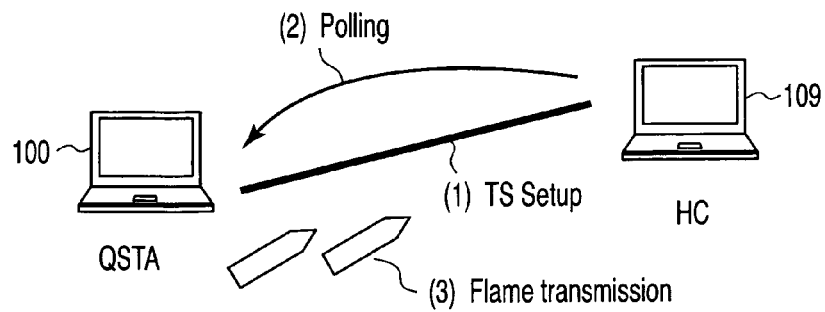
FIG. 5 is a view for explaining HCCA in the IEEE 802.11e standard.

FIG. 5 is a view for explaining HCCA in the IEEE 802.11e standard. In HCCA, a QoS access point (QoS-AP) 109 called HC (Hybrid Coordinator) is a polling (scheduling) entity.

When communication is to be started, a TS (Traffic Stream) is set up (Uplink, Downlink, Bidirectional) between the QoS-nonAP-STA (QoS terminal other than an access point; to be referred to as "QSTA" hereinafter) 100 and the HC 109. The setup of the TS is started by a QSTA serving as an entity. The TS is a path for data frames which indicates what type of traffic (e.g. VoIP or FTP) the terminal uses and what amount of bandwidth is required. The specification of the TS is uniquely determined by a TSPEC (Traffic Specification). The TSPEC stores information such as the maximum allowable delay interval (Maximum Service Interval) of a flow and a TSID (Traffic Stream ID) for identifying a traffic stream. In this case, the most important parameter is a mean data rate that defines average data rate specified at MAC-SAP.

The TSPEC notified as a parameter for QoS control notified from the QSTA 100 to the HC 109 is used for scheduling utilized by the HC 109. Note that multiple (a plurality of) TSs can be set for each application to be used. The HC 109 then executes a polling sequence for the QSTA 100 in accordance with the TS. A practical algorithm for scheduling in the polling sequence is not defined in IEEE 802.11e, and hence is implementation-dependent. When a TXOP (Transmission Opportunity; allocated transmission time) is given to the QSTA 100 by polling from the HC 109, the QSTA 100 can transmit multiple frames in the allowed period of time.

According to the HCCA scheme, since each MAC frame has its own TIDs (Traffic ID) in communication with a QSTA, a plurality of traffic streams can be aggregated.

Figure 6:
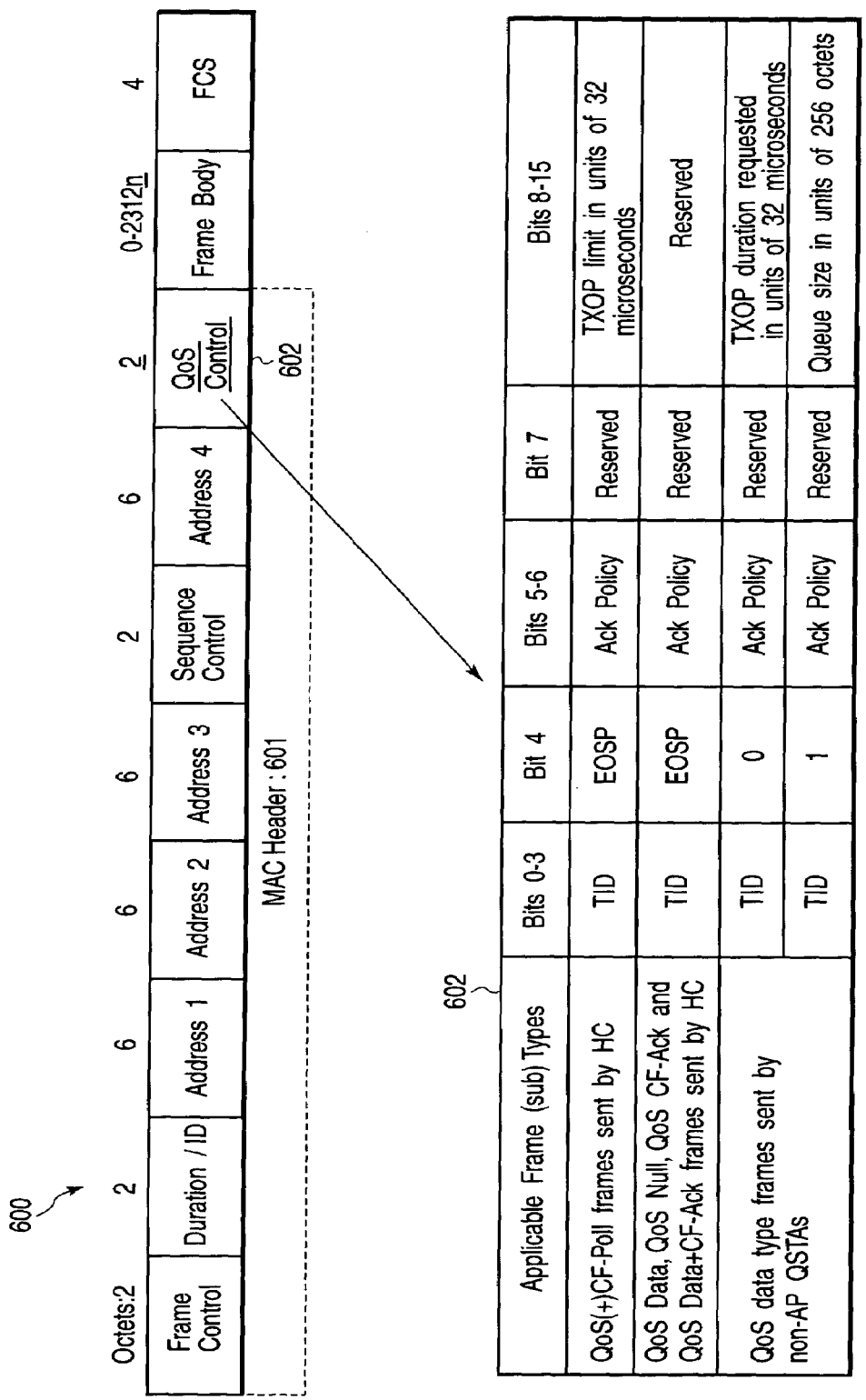
FIG. 6 is a view showing the format of each MAC frame to be aggregated.

FIG. 6 is a view showing the format of each MAC frame in the IEEE802.11e standard. When frame aggregation method is to be executed with HCCA protocol, each MAC frame 600 has a unique MAC header 601 and can uniquely specify a TS by the TID in the MAC header 601. No critical problem therefore arises in terms of compatibility between HCCA and frame aggregation. A TID is written in a QoS control field (QoS control) 602 extended for IEEE 802.11e to identify a traffic. The TID field's length (0th to 3rd bits) is four bits. Of these ordinal numbers, TSIDs use the eighth to the 15th.

The first to fourth embodiments will be described in detail below.

First Embodiment

The first embodiment of the present invention is directed to frame retransmission control associated with communication quality and communication sequences for various kinds of acknowledgement frames indispensable to retransmission procedure. More specifically, a communication apparatus according to the first embodiment is designed to transfer an Ack policy for "No acknowledgement" defined in IEEE 802.11e and an Ack policy for partial Acks for frame aggregation. As described above, as QoS protocol, HCCA is assumed, which guarantees quality for each traffic stream.

Figure 7:
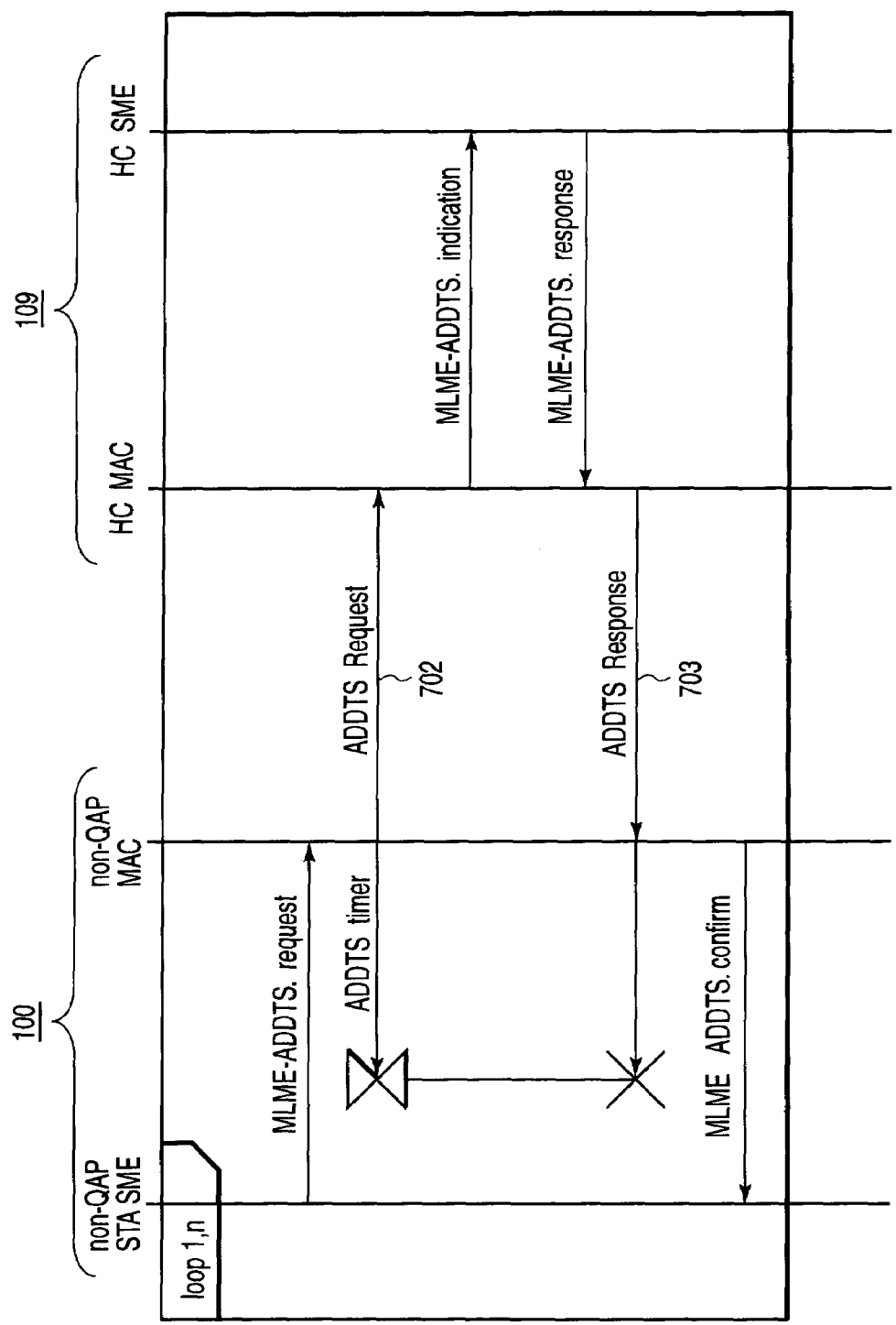
FIG. 7 is a view showing a TS setup sequence.

FIG. 7 is a view showing a TS setup sequence. A QSTA (communication apparatus) 100 transmits a TSPEC embedded in an ADDTS Request message to an HC 109 at the start of each traffic transfer. IEEE 802.11e does not define which kind of parameter is to be selected. That is, a TSPEC is implementation-dependent. When the ADDTS Request message is accepted by the HC (SME (Station Management Entity) of the HC to be precise) 109, an ADDTS Response is returned from the HC 109, thereby setting TS in due form. Subsequently, the HC 109 performs scheduling such as sending data or poll on the basis of the set TSPEC information of the TS.

Figure 8:
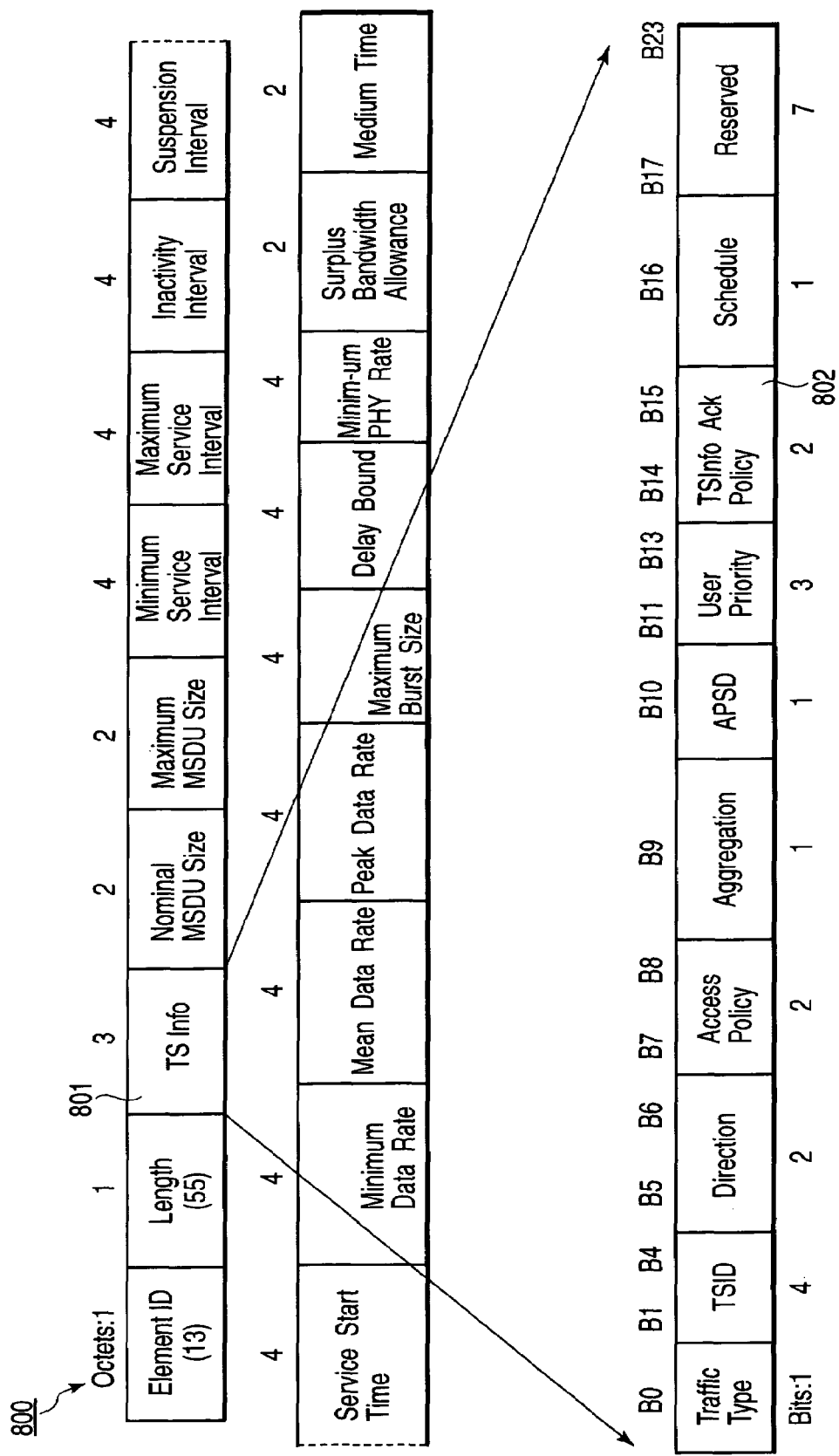
FIG. 8 is a view showing the format of a TSPEC.

FIG. 8 is a view showing the format of a TSPEC. When a TS is to be set, bandwidth at MAC-SAP required for the QoS flow is set in the mean data rate field of a TSPEC 800.

A TS Info field 801 of the TSPEC 800 includes an Ack policy field 802 which indicates in what kind of acknowledgement scheme an MPDU (MAC Protocol Data Unit) belonging to the corresponding TID should be transmitted.

FIG. 9 is a view showing the contents of an Ack policy field. According to the first embodiment of the present invention, a value 902 equivalent to Reserved in the prior art is set as a partial acknowledgement (Partial_ACK) for frame aggregation. The MAC layer of a terminal which transmits a MAC super frame determines an Ack policy for each data frame descending from an upper layer. In this case, designating an Ack policy to a partial ACK means that "the data frame is set as a frame aggregation target, and an ACK response from the receiving side is required". With regard to a TS in which "Partial_ACK" (902 in FIG. 9) and "No_ACK" (901 in FIG. 9) are designated in the Ack policy field 802 of TSInfo in FIG. 8, the transfer of frame aggregation by a MAC super frame is supported (a plurality of TSs are added with different ADDTSs).

Conventionally, the Ack policy field 802 of TSInfo indicates what ACK mechanism is to be used to transfer a frame. As such mechanisms, three types of mechanisms, namely "Normal_Ack (Normal IEEE802.11 acknowledgement)", "No_ACK (No acknowledgement)", and "Block_ACK (Block Acknowledgement)", have already been defined in IEEE 802.11e.

"Normal_Ack" is a normal data transmission method supported by IEEE 802.11, in which after one unicast data is transmitted, the transmitting terminal (originator) waits for a predetermined period of time until it receives an ACK frame from the destination terminal. When a timeout occurs, back-off procedure is performed again to retransmit the data frame. The data frame designated in "Normal_Ack" is not set as a frame aggregation target, and is transmitted in accordance with a procedure in the existing IEEE 802.11 standard.

"No_ACK" is a data transmission method used when a transmission channel is relatively stable. According to this method, a terminal transmits a new unicast data frame without waiting for the reception of an ACK frame from a destination terminal.

"Block_ACK" is a data transmission method of consecutively transmitting unicast data frames at SIFS (Short Inter Frame Space) intervals. This method is designed to realize selective repeat retransmission by using Block Ack frames. A plurality of acknowledgements belonging to the same TID are combined into one Block Ack frame. That is, a plurality of Block Ack frames are required for each TS. In this method, a data frame with Block Ack Policy is not set as a frame aggregation target, and a Block Ack transmission sequence in the existing IEEE 802.11e standard is executed.

Figure 10:
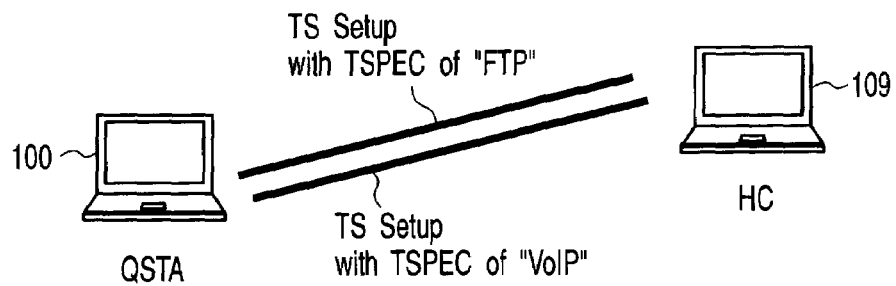
FIG. 10 is a view showing an example of how TSs and TSPECs are set.

FIG. 10 is a view showing an example of how TSs and TSPECs are set. A plurality of TSs having independent Ack Policies are set for each TID. A plurality of TSs with different TSPECs are set like Partial_ACK for FTP, No_ACK for Video, and Block_ACK for VoIP.

Figure 11:
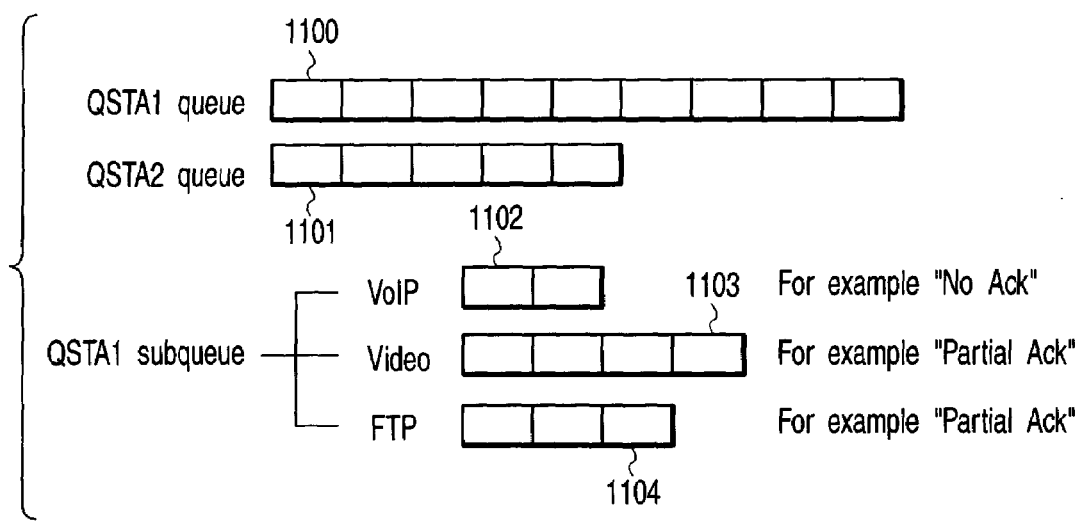
FIG. 11 is a view showing STA queues and priority subqueues.

FIG. 11 is a view showing examples of STA queues and priority subqueues. In a communication scheme according to the first embodiment, HC prepares transmission queues (destination queues) 1100 and 1101 for each destination QSTA for which a TS is set. Subqueues 1102, 1103, and 1104 are prepared in the destination queues 1100 and 1101. Note, however, that these subqueues are generated only for data frames in which the Ack Policies for TSPECs are designated to "No_ACK" and "Partial_ACK". A QSTA also generates a queue for each destination terminal and a subqueue for each priority in the same manner as described above. Frames which are not set in subqueues for the respective priorities in a destination queue (data frames of "Normal_ACK" and "Block_Ack" and management frames) are stored in a normal transmission queue (TxQ, a beacon queue (BcQ) for beacons, or the like).

In the first embodiment of the present invention, when data transmission is to be performed by frame aggregation, the data frames of both the Ack Policies of "No_ACK" and "Partial_ACK" can be packed into one PHY frame. This also means that all the data frames can be transmitted according to the "No_ACK" policy and can also be transmitted according to the "Partial_ACK" policy. As described above, the "Partial_ACK" policy means an Ack Policy that is applied to MAC frames which are frame aggregation targets and require acknowledgement responses.

Figure 12:
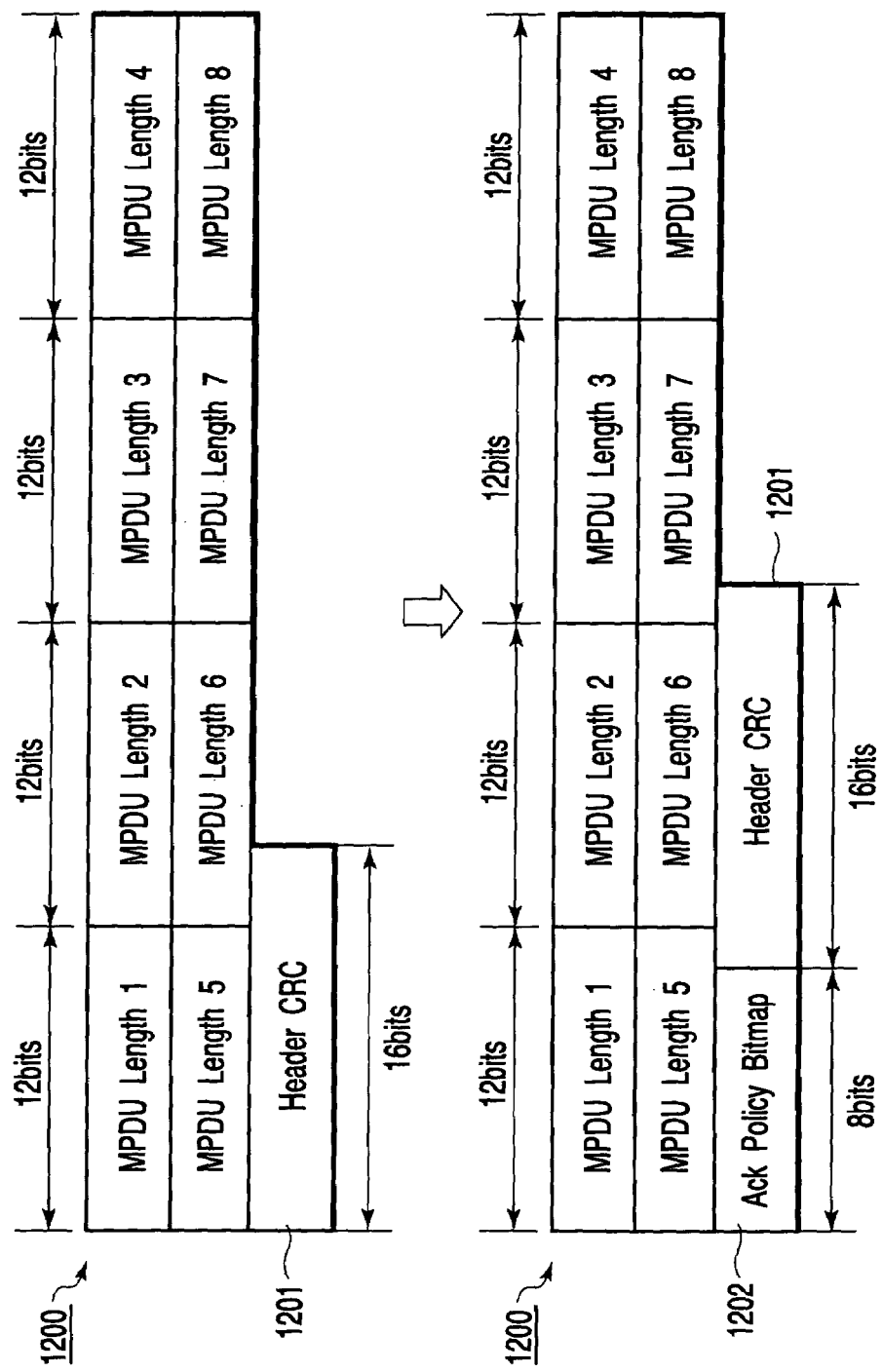
FIG. 12 is a view showing an extended bitmap of an Ack policy bitmap.

FIG. 12 is a view showing how an Ack Policy bitmap is extended. In this case, the maximum number of frames aggregated is set to eight. This maximum number is, however, implementation-dependent. In frame aggregation, a MAC super frame header 1200 is added to the head of a MAC super frame. This header contains a header CRC (16 bits) 1201 and a field indicating the length (12 bits) of each of the aggregated MPDUs.

In this embodiment, as shown in FIG. 12, a new Ack Policy Bitmap field 1202 is added. This bitmap indicates whether or not each MPDU aggregated in the MAC super frame requires ACK (Partial_ACK in this case). If, for example, the MPDUs in the MAC super frame are set like "ACK not required-ACK not required-ACK not required-ACK not required-ACK required-ACK required-ACK required-ACK required", Ack Policy Bitmap is expressed by "00001111" (the latter four bits are portions requiring a partial Ack bitmap).

A terminal which has transmitted a MAC super frame basically caches Ack Policy Bitmap information. A copy of a transmitted data frame is buffered to prepare for retransmission until a Partial Ack frame is received. Since a data frame for which "ACK not required" is designated is not retransmitted upon the timeout of an acknowledgement, there is no need to store a copy of the frame after transmission. In contrast, with regard to a data frame for which "ACK required" is designated, the frame must be buffered to prepare for retransmission. If, however, frames for which "ACK not required" (No_ACK) are not stored, the transmitting side preferably caches relative positional information of a transmitted data frame corresponding to "ACK required", whose copy is stored on the transmitting side and a data frame corresponding to "ACK not required" (no copy thereof is stored) (an implementation method having no relative positional information will be described later).

Upon receiving a MAC super frame, the terminal determines whether this super frame is addressed to itself, and performs CRC (Cyclic Redundancy Check) calculation for each MPDU. Thereafter, the terminal checks the Ack Policy Bitmap field 1202 in the MAC super frame header. If a flag of "1" indicating the necessity of an acknowledgement is set, the value "1" or "0" is set in the corresponding bitmap of the Partial Ack frame (if it is determined upon CRC calculation that the frame has been properly received, "1" is set; otherwise, "0" is set). An MPDU in which the Ack Policy Bitmap is "0" desires transfer by "No_ACK". In this case, therefore, the value "0" is set regardless of the CRC calculation result.

If no Partial Ack frame can be received from the destination terminal even after the lapse of a predetermined period of time since the transmission of a MAC super frame, data frames for which the "Partial_ACK" policy has been designated and which have been buffered can be aggregated into a MAC super frame, and new data frames corresponding to "No_ACK" policy can be aggregated. In this case, the retransmission of a data frame is abandoned after the lapse of a predetermined period of delay bound of the TSPEC.

When the terminal which has transmitted the MAC super frame receives a Partial Ack from the destination terminal, the transmitting terminal checks the Partial Ack Bitmap using the Ack Policy Bitmap information cached in it. If the bit information of the Partial Ack Bitmap is "0", the corresponding data frame is retransmitted.

Since a TS is used in the channel access scheme based on HCCA, each terminal can transmit/receive a MAC super frame and Partial Ack frame at SIFS intervals for the period determined by TXOP. If all the frames aggregated into the MAC super frame are those designated with "No_ACK" (i.e., all the Ack Policy Bitmap fields are 0), a new MAC super frame is generated and transmitted after the lapse of SIFS without waiting for a Partial Ack.

The coexistence of the "No_ACK" policy and "Partial_ACK" policy will be described in detail below with reference to two retransmission control examples.

Figure 13:
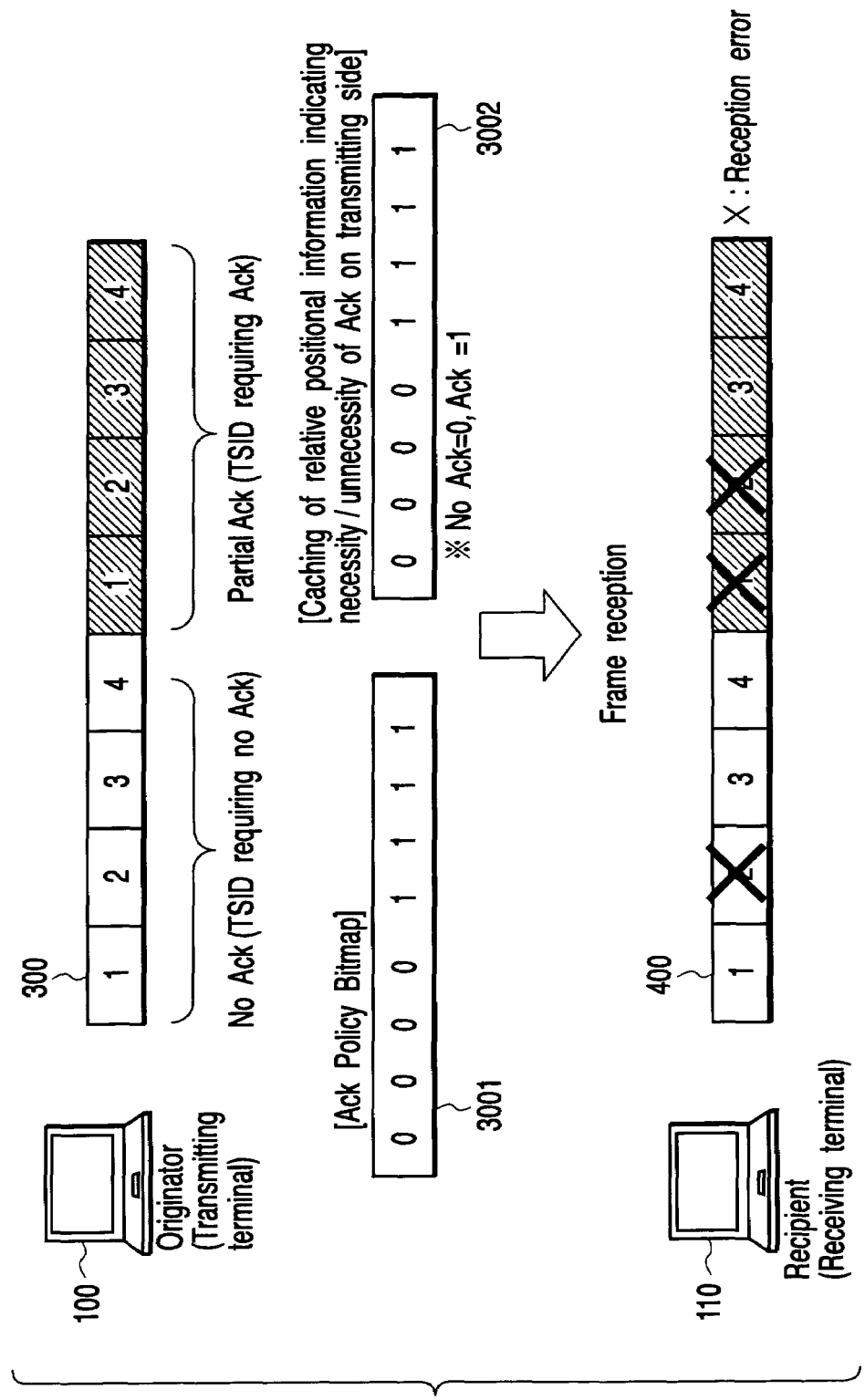
FIG. 13 is a view for explaining a retransmission control example (A)

In a retransmission control example (A), the transmitting side caches the relative positional information of Ack Policies in advance. As shown in FIG. 13, when transmitting a MAC super frame 300, the transmitting terminal 100 caches in advance bitmap information 3002 indicating relative positions which indicate which MPDUs of the aggregated MPDUs require acknowledgements ("Partial_ACK" must be dealt with on the receiving side) and do not required ACKs (No_ACK policy). As indicated in an Ack Policy Bitmap 3001, the first half frames with sequence number "1" to "4" in the MAC super frame 300 correspond to "No_ACK", i.e., TSIDs which do not require ACKs, whereas the second half frames "1" to "4" correspond to Partial_ACK, i.e., TSIDs which require ACKs.

Figure 14:
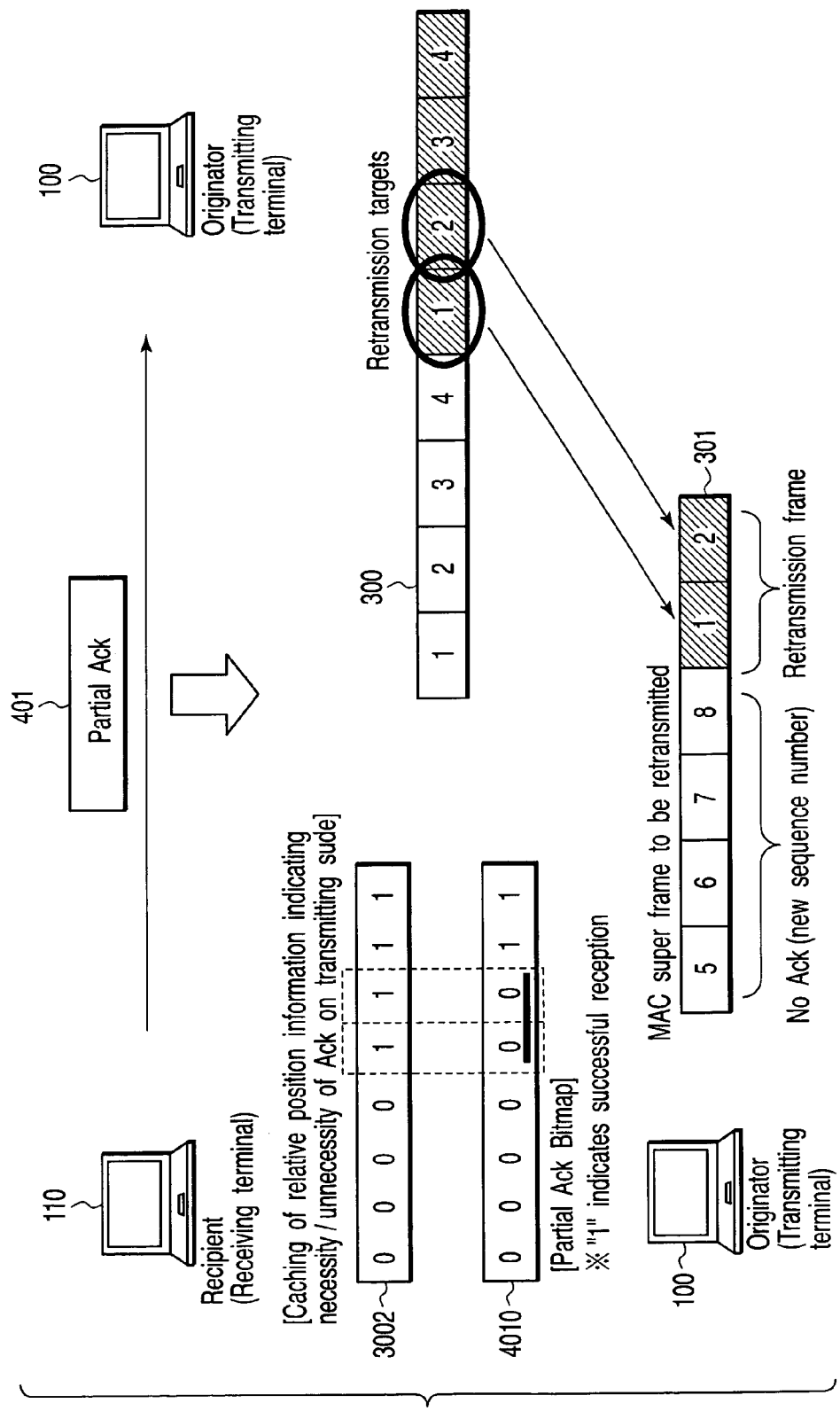
FIG. 14 is another view for explaining the retransmission control example (A)

A receiving terminal (recipient) 110 refers to the Ack policy bitmap in the MAC super frame header of a received frame 400. The receiving terminal 110 performs CRC calculation, and if it is determined that the frame is properly received and the frame needs acknowledgement, the corresponding information is written in a Partial Ack 401, and is returned to the transmitting side (in the example shown in FIG. 14, "1" is set in a Partial Ack Bitmap 4010).

Assume that the transmitting terminal 100 determines, on the basis of the Partial Ack Bitmap 4010 and the Ack policy relative positional information 3002, that MPDUs whose Ack policies are not "No_ACK" (i.e., portions requiring ACKs) have not been properly transmitted. In this case, the corresponding MPDUs are aggregated as retransmission targets into a MAC super frame 301 again and retransmitted. Since there is no need to retransmit portions whose Ack Policies correspond to "No_ACK", they may be released from a retransmission buffer (if copies of "No_ACK" policy frames have been buffered), and new frames may be packed in the MAC super frame. In the example shown in FIG. 14, when MPDUs "1" and "2" which require ACKs from the receiving side are to be packed in the MAC super frame 301, MPDUs "5" to "8" which are new sequence numbers which correspond to the No_ACK policy are simultaneously aggregated.

A characteristic feature of the above retransmission control example (A) is that information sent to the transmitting side in the form of a Partial Ack Bitmap is equivalent to "a bitmap for indicating properly received MPDUs".

In a retransmission control example (B), the transmitting terminal determines MPDUs to be retransmitted on the basis of a Partial Ack Bitmap from the receiving side. In the retransmission control example (A), the transmitting side caches in advance the relative positional information 3002 of portions corresponding to the No_ACK policy and portions requiring Partial Acks. In contrast to this, in the retransmission control example (B), the meaning of the bitmap in a Partial Ack is changed, and the transmitting terminal requests "a bitmap for MPDUs to be retransmitted" instead of "a bitmap corresponding to properly received MPDUs" from the receiving side (so-called NACK). In the retransmission control example (B), the transmitting terminal 100 need not cache any special information as long as it buffers the MPDUs for retransmission.

Figure 15:
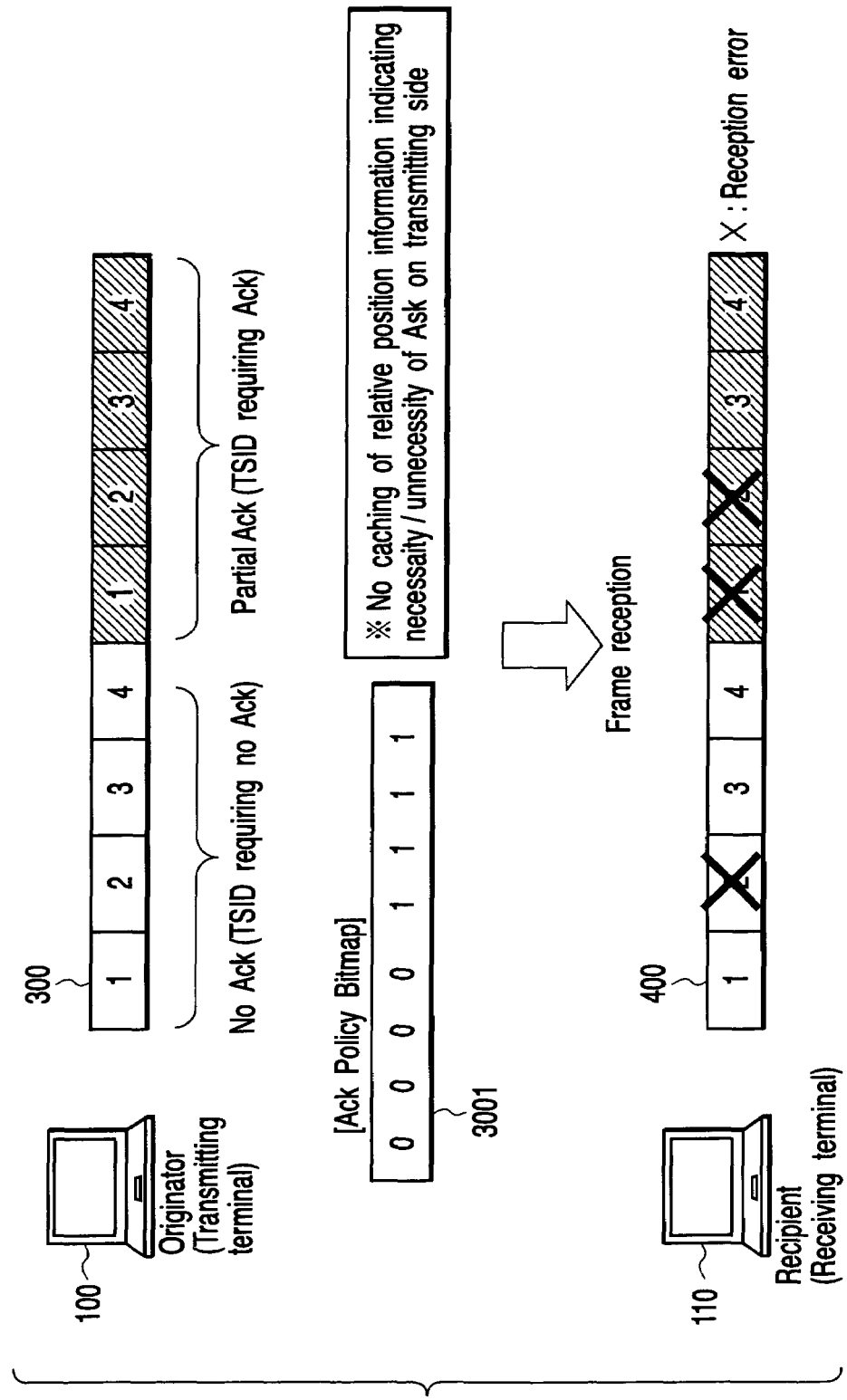
FIG. 15 is a view for explaining a retransmission control example (B)

As shown in FIG. 15, upon receiving a MAC super frame 400, the terminal 110 refers to an Ack policy bitmap 3001 in the MAC super frame header to recognize MPDUs which require ACKs, as in the retransmission control example (A). If a bit of the Ack Policy Bitmap 3001 is set, and the CRC calculation result on the corresponding MPDU indicates an error, a bit representing a retransmission request is set, and a partial Ack 402 is returned to the transmitting terminal 100.

Figure 16:
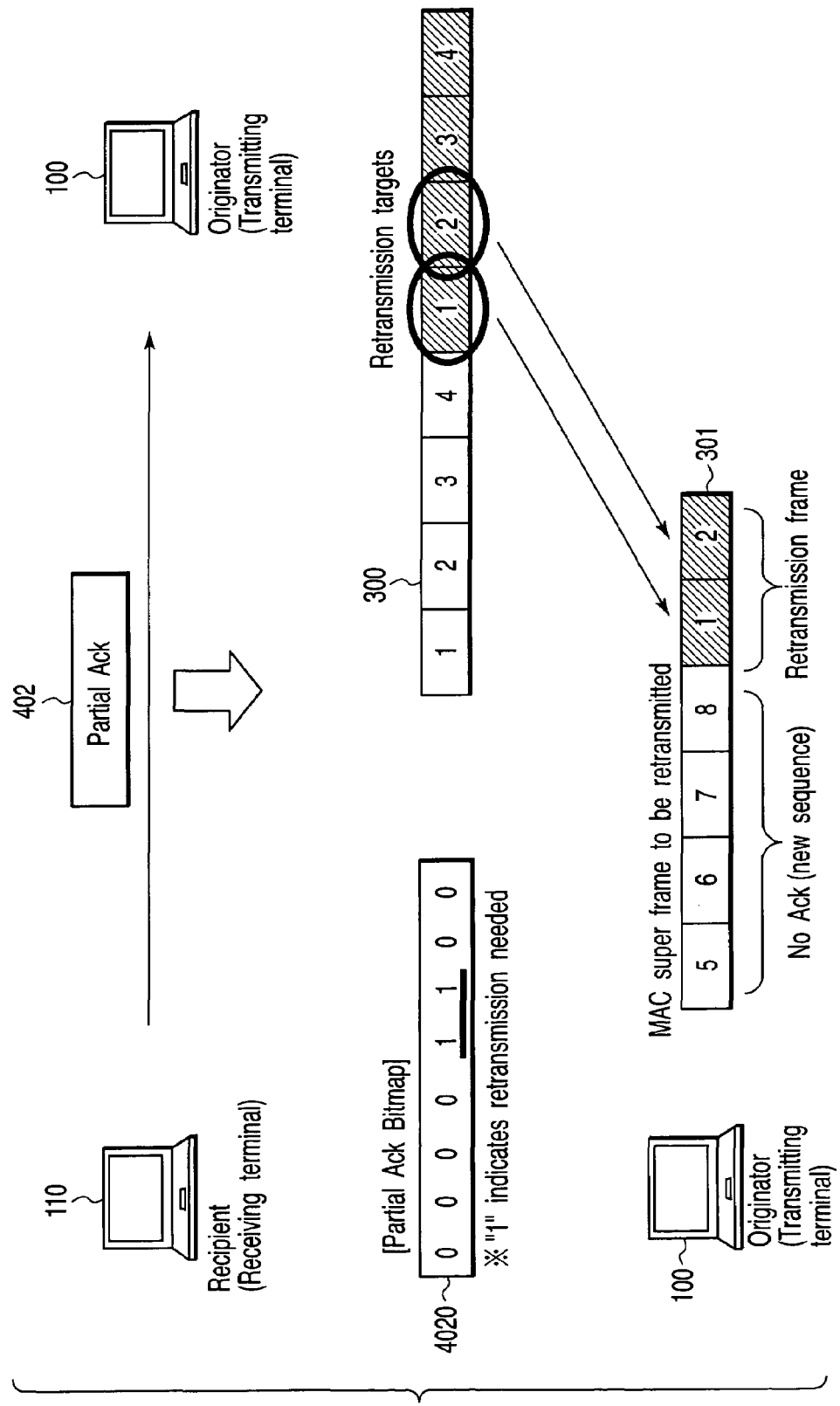
FIG. 16 is another view for explaining the retransmission control example (B)

As shown in FIG. 16, the transmitting terminal 100 refers to a Partial Ack Bitmap 4020 in the Partial Ack 402 from the receiving terminal 110. If a bit corresponding to a portion to be retransmitted is set ("1" in the case shown in FIG. 16), the transmitting terminal 100 determines that the corresponding MPDU should be retransmitted. The subsequent processing is the same as in the retransmission control example (A).

As described above, according to the first embodiment of the present invention, adding an extended field to a MAC super frame header makes it possible to realize a communication apparatus which can use both Ack policies of "No_ACK" and "Partial_ACK" in combination with each other. The first embodiment can also be adaptable for negativelogic.

Second Embodiment

The second embodiment of the present invention is directed to a communication apparatus which, when transmitting MAC frames with different priorities, performs frame aggregation upon dividing the MAC super frame payload in the MAC super frame according to the priorities.

Assume that unicast data frames with different priorities are aggregated by using conventional frame aggregation without any change. In this case, there is a chance that the frames are randomly packed in the MAC super frame like "low", "high", "intermediate", "high", "low", "high", "intermediate", and "intermediate". According to the characteristics of a wireless propagation path, as the PHY frame length increases, errors tend to occur more easily toward the end of the frame, resulting in a deterioration in transmission efficiency.

According to the second embodiment of the present invention, therefore, frame aggregation is executed after the payload is divided according to the priorities of the frames like "high", "high", "high", "intermediate", "intermediate", "intermediate", "low", and "low".

If, for example, frames corresponding to a traffic stream using the "No_ACK" policy are arranged in the front part, and frames corresponding to a traffic stream with a relatively low priority are arranged in the rear part, efficient transfer can be realized. This is because the retransmission of a frame with a low priority due to a reception error is more allowable than the retransmission of a frame with a high priority.

FIG. 17 is a view showing frame aggregate examples 1 and 2 formed on a priority basis. The method of aggregating frames upon dividing the payload according to the priorities can be implemented more easily by using a priority subqueue for each STA. The number of MPDUs for each priority is determined in accordance with, for example, Mean Data Rate indicated by a TSPEC. If there are no MPDUs which have different priorities, as many MPDUs corresponding to the TS as possible are packed, as in aggregate example 2.

Figure 18:
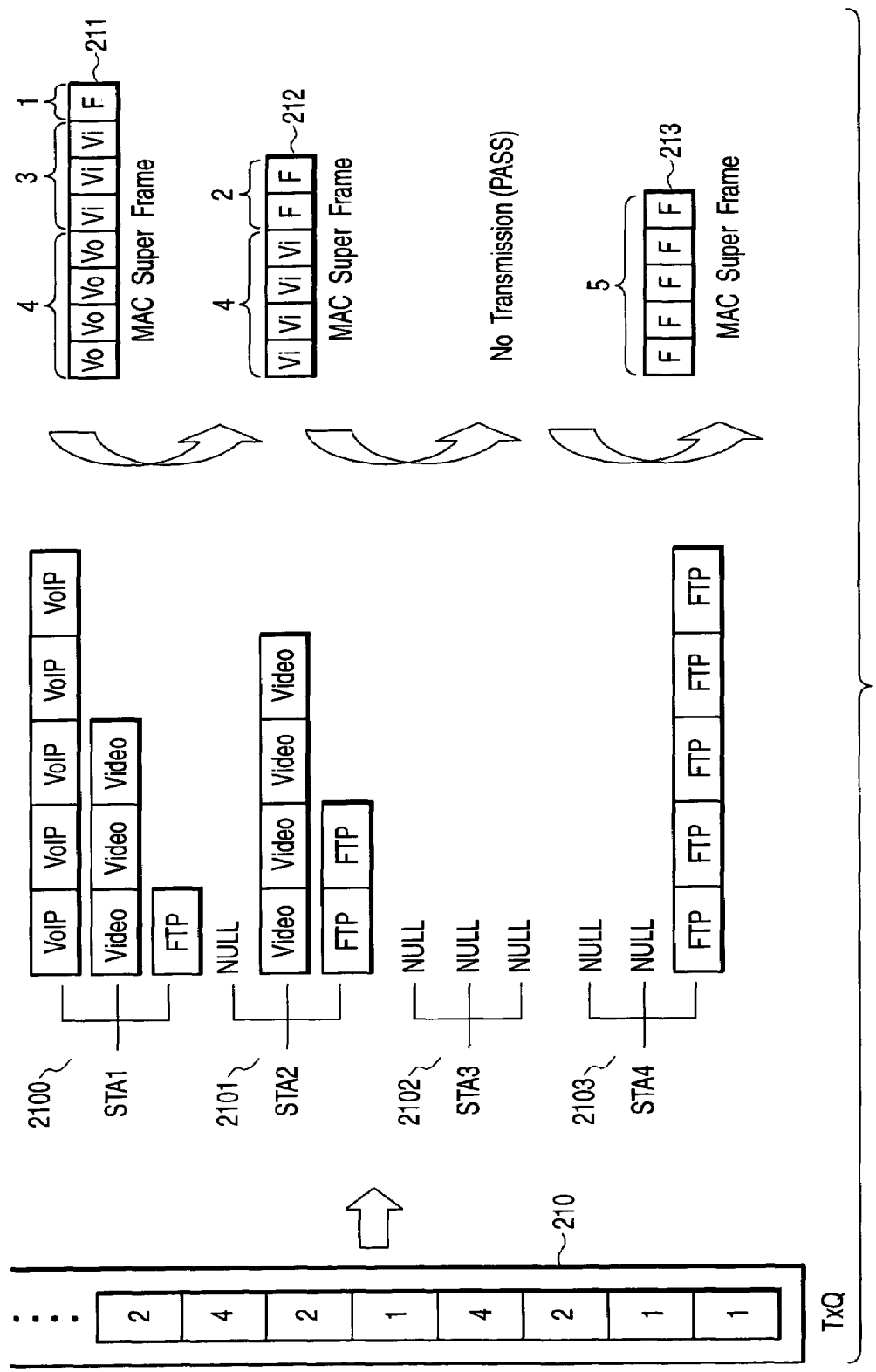
FIG. 18 is a view for explaining frame aggregation for each priority.

For example, as shown in FIG. 18, frames are extracted from a main queue (TxQ) 210 for respective STAs and respectively stored in priority subqueues 2100 to 2103 for the respective STAs (STA 1 to STA 4 in this case). First of all, with regard to the subqueue 2100 for the STA 1, four frames are extracted from the VoIP subqueue. Three frames are then extracted from the Video subqueue and arranged after the VoIP frame group. One frame is further extracted from an FTP subqueue and placed after the Video frame group, thereby constructing a MAC super frame 211. With regard to the subqueue 2101 for the STA 2, four frames are extracted from the Video subqueue. Two frames are then extracted from the FTP subqueue and arranged after the Video frame group, thereby constructing one MAC super frame 212. With regard to the subqueue 2102 for the STA 3, since all the subqueues are empty, no transmission is performed. With regard to the subqueue 2103 for the STA 4, five frames are extracted from the FTP subqueue to construct one MAC super frame 213. The number of frames extracted from each priority subqueue is implementation-dependent.

The definition of priority will be described in detail below.

(1) TCLAS (Traffic Classification)

Figure 19:
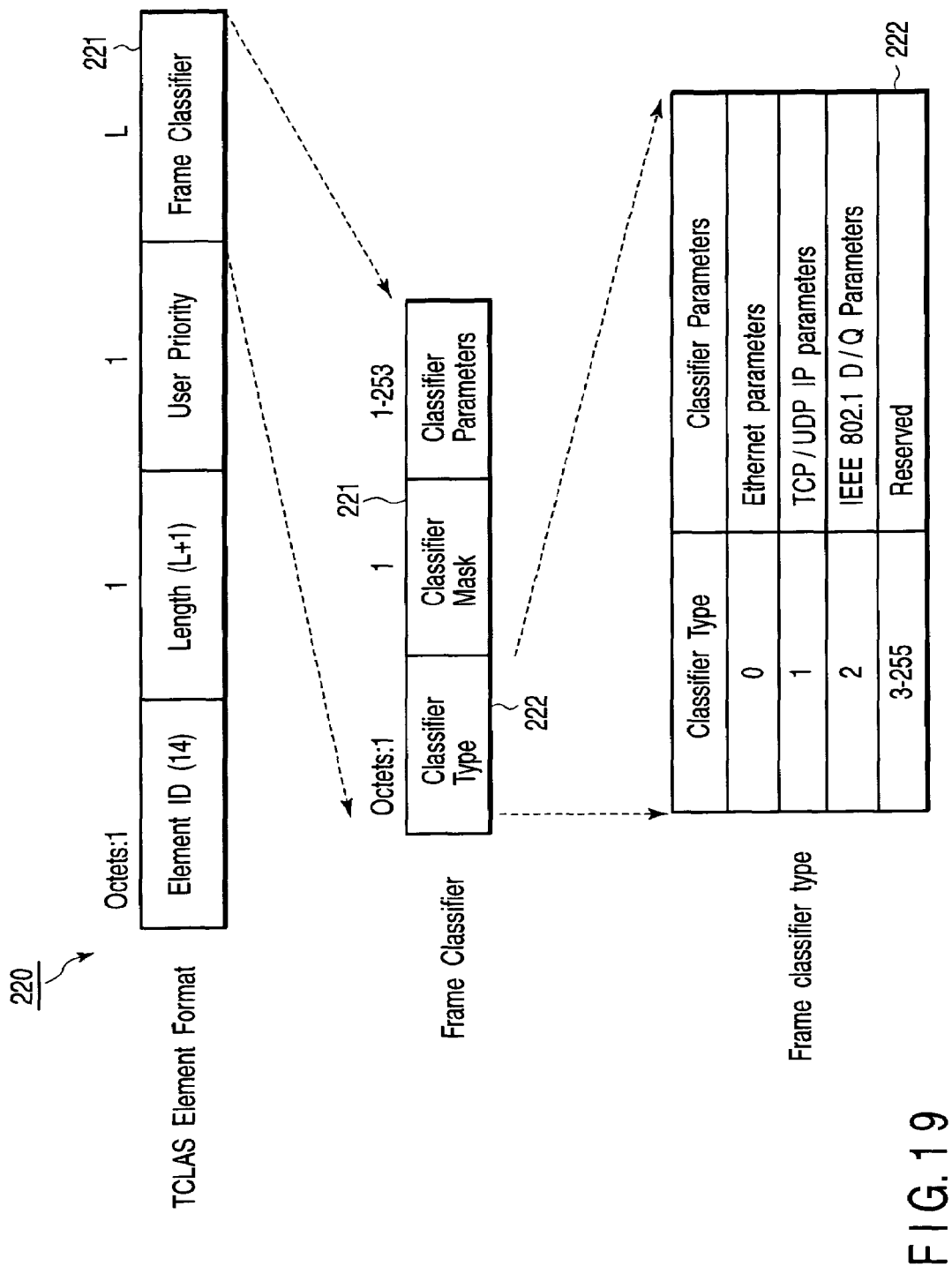
FIG. 19 is a view showing the format of a TCLAS element.
Figure 20:
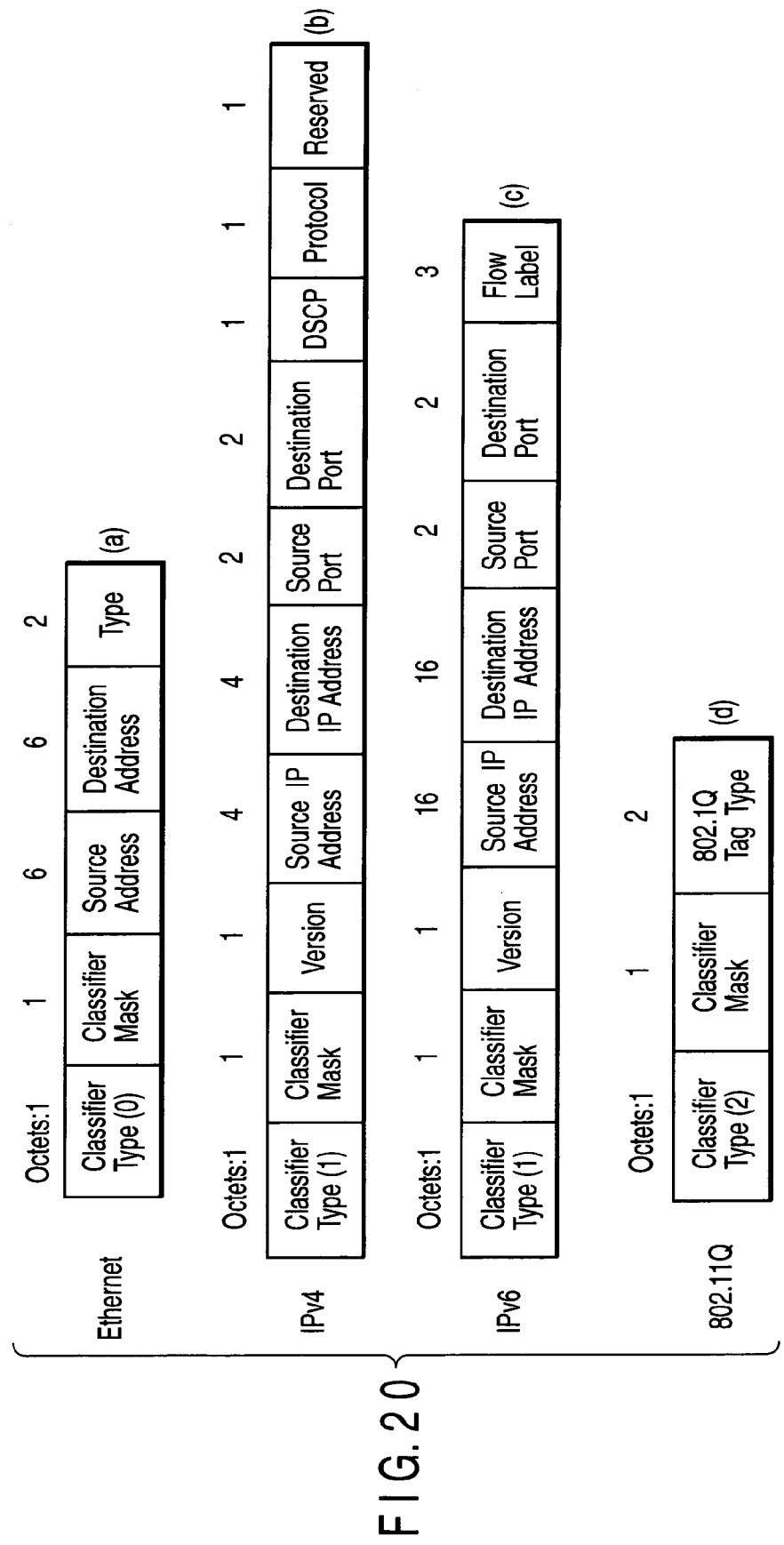
FIG. 20 is another view showing the format of a TCLAS element.

A TCLAS specifies certain parameter values to identify the MSDUs belonging to a particular traffic stream. The classification process performed above MAC-SAP at a HC uses the parameter values for given TS to examine each incoming MSDU and determine whether this MSDU belongs to that TS. FIGS. 19 to 20D are views showing the format of a TCLAS element. Classifier (classification process) on MAC-SAP distributes MSDUs from an upper layer for each TS set up by itself. If, for example, IPv4 exists as an upper layer protocol as shown in FIG. 20B, the Classifier process determines a specific TS for mapping by using an IP address, port number, and DSCP (Diffserve Code Point: the identification information of an IP packet used for QoS service Diffserve (Differentiated Services) implemented on the IP layer).

(2) TSPEC (Traffic Specification)

The QoS characteristics of a data flow to and from a non-AP-QoSSTA. The main purpose of a TSPEC is to ensure a resource in an HC and change the behavior of scheduling of the HC. A TSPEC also defines the Ack Policy of a data frame (identified by a TSID) flowing through the TS. A TSPEC is generated by an SME (Station Management Entity) in a MAC in accordance with a request from an application.

A TS has one or more TCLASs (depending on the determination by a QSTA which sets the TS). TCLASs are mapped in the TS. The HC is notified of the information of a TSPEC and TCLAS by ADDTS procedure from the QSTA. FIG. 21A shows the contents of an ADDTS Request. FIG. 21B shows the contents of an ADDTS Response.

When the negotiation of a TS is properly performed, the TS is discriminated in the QSTA on the basis of the TSID and direction (Uplink, Downlink, Bi-directional) information, and is discriminated in HC on the basis of the TSID, direction information, and the address information of the QSTA.

Note that even if the direction of the TS is Downlink from an HC to a QSTA, the QSTA becomes an initiator for TS setup.

In summary, when given application data (e.g., VoIP) is sent from an upper layer to a MAC layer, the application data is mapped in the TS associated therewith in accordance with the information (IP address, port number, DSCP, and the like) of a TCLAS. Each data frame has TID identification information (the TSID of VoIP in this case) in the MAC header, which is used for data/poll transmission scheduling. Note that in HCCA, no frames other than those corresponding to the set TS are transmitted. In order to transmit such frames, a new TS must be set.

In OFDM, channel estimation (estimating phase and amplitude distortions in a transmission channel for each subcarrier) is performed by using a known preamble signal (long symbol in IEEE 802.11a) stored in a receiving terminal. A wireless LAN which performs communication in the packet mode and in which time variations in transmission channel in each packet (frame) are small generally uses a technique of independently performing channel estimation at the head of a preamble signal for each packet.

If, however, the frame length increases like a MAC super frame, since a transmission channel varies with time, the estimation result calculated at the time of the reception of a preamble may not accurately be reflected in the second half part of the frame with higher possibility. Packing MPDUs with high priorities in the first half part of a MAC super frame as in the second embodiment makes it possible to improve the error tolerance of high-priority data.

Figure 22:
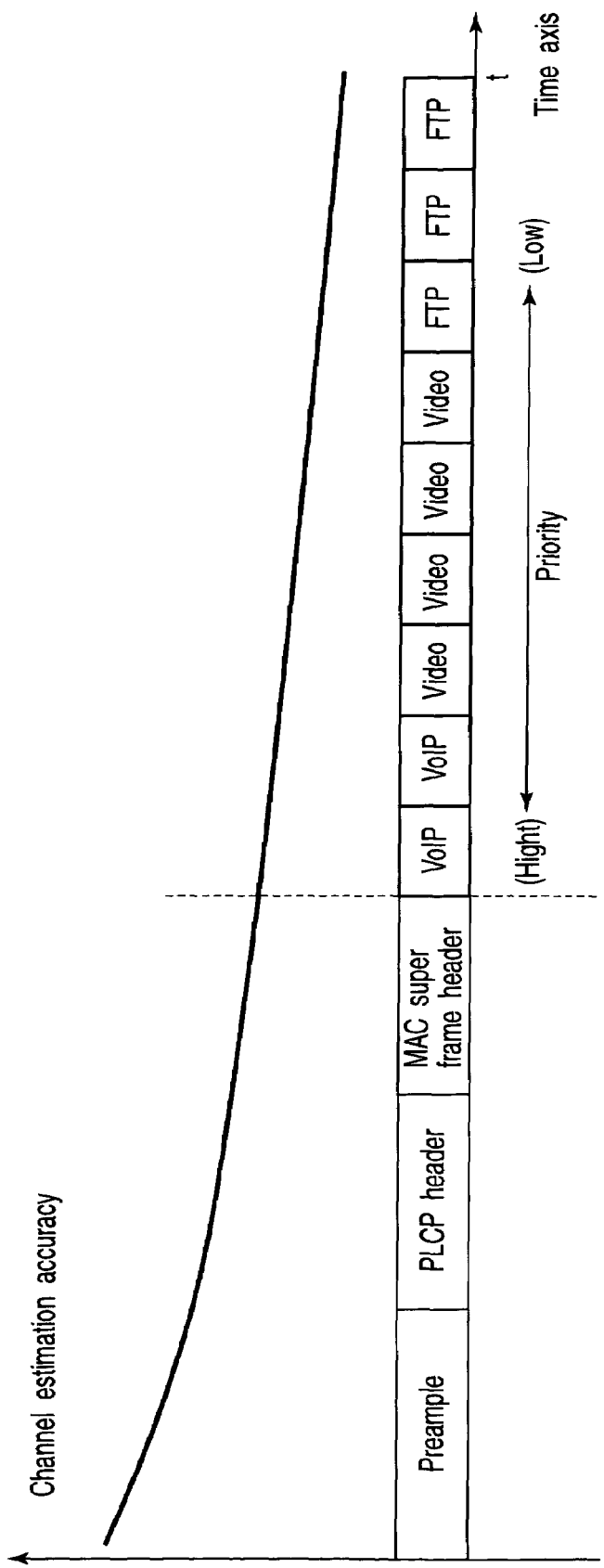
FIG. 22 is a graph showing the relationship between the channel estimation accuracy and the temporal position of frame aggregation on the format.

FIG. 22 is a graph showing the relationship between the channel estimation accuracy and the temporal position of frame aggregation on the format. The ordinate represents the channel estimation accuracy; and the abscissa, the time axis. As is also easily understood from this graph, the error tolerance can be improved by aggregating high-priority MPDUs at forward positions on the time axis.

Third Embodiment

The third embodiment of the present invention is directed to the execution of sliding window control for frame aggregation in QoS based on the HCCA scheme. A communication apparatus according to the third embodiment applies sliding window control to MAC frames delimited in one PHY frame according to the respective priorities.

In this case, sliding window control is a technique for properly controlling retransmission addressed to the same terminal in consideration of the fairness and QoS (Quality of Service) of communication. A sliding window used for this control is expressed by a transmission management table representing transmission and reception histories including a retransmission history.

Consider a situation wherein a given transmitting communication apparatus consecutively transmits MAC frames (MPDUs) to the same receiving communication apparatus preferentially over other communication apparatuses. In order to prevent transmission and reception rights from being disproportionately assigned to a specific communication apparatus, the number of MAC frames that can be consecutively transmitted is limited on the basis of the transmission management table. Assume that this limitation is effective until either the transmitting communication apparatus or the receiving communication apparatus is changed. According to sliding window control, the overflow of the buffer in a receiving terminal due to excessive retransmission.

Conventionally, when, for example, an error occurs in the first MAC frame in a MAC super frame, even if the remaining MAC frames are properly received, they are not forwarded to an upper layer on the receiving side, and the subsequent MAC frame is stored in the buffer (to prevent sequence reversal problem at receiving side). If the transmitting side finds the error in the first MAC frame upon checking a returned partial Ack frame, the transmitting side retransmits only the first MAC frame without adding any new frame. If such a conventional method is applied to a MAC super frame containing frames with different priorities without any change, the following problem arises.

Assume that frames having different priorities are aggregated like "high", "high", "intermediate", "intermediate", "intermediate", "low", "low", and "low", and transmitted, and the reception state is represented by "01111110" (note that "1" indicates a successful reception determined by CRC check; "0", an error).

Unique sequence numbers are respectively assigned to the MAC frames for each TID (even if sequence numbers become redundant, the corresponding MAC frames can be uniquely identified with different TIDs). In this case, all frames with an intermediate priority are thought to be forwarded to an upper layer at the receiving terminal. If, however, sliding window control for frame aggregation is applied to this operation without any change, since the first MAC frame in the MAC super frame has an error, all the remaining MAC frames cannot be forwarded to the upper layer.

In order to solve this problem, the third embodiment of the present invention executes independent sliding window control for each priority. In the above case, in the high-priority category, the first MAC frame has an error, and hence the remaining frames are buffered. In the intermediate-priority category, all the frames are properly received and hence can be forwarded to the upper layer. In the low-priority category, after the first MAC frame is transferred to the upper layer, the retransmission of the next MAC frame is waited for. As in the first embodiment, if a MAC super frame having two Ack Policies, i.e., "No_ACK" and "Partial_ACK", is received, all data frames corresponding to the No_ACK policy may be unconditionally forwarded to the upper layer.

The transmitting terminal determines on the basis of the lifetime of each MAC frame whether to retransmit or discard the frame. If the window size of a sliding window is unlimited, the frame length of a MAC super frame becomes unnecessarily large. For this reason, the maximum window size for each TS is preferably determined in advance using information of a TSPEC (e.g. Mean Data Rate, Delay Bound).

Retransmission control for each priority will be described in detail below. First of all, unlike in the IEEE 802.11 legacy standard, in the IEEE 802.11e standard, sequence numbers are independently assigned for the respective TIDs (TSIDs in the case of HCCA). For example, consecutive sequence numbers exist in the respective TSIDs like "0 1 2 3 4 5, . . . " in TSID for VoIP, "0 1 2 3 4 5, . . . " in TSID for Video, and "0 1 2 3 4 5, . . . " in TSID for FTP. On the QoS data receiving side, if frames are consecutive for each TSID, the frames can be released from the reception buffer and transferred to the upper layer.

Figure 23:
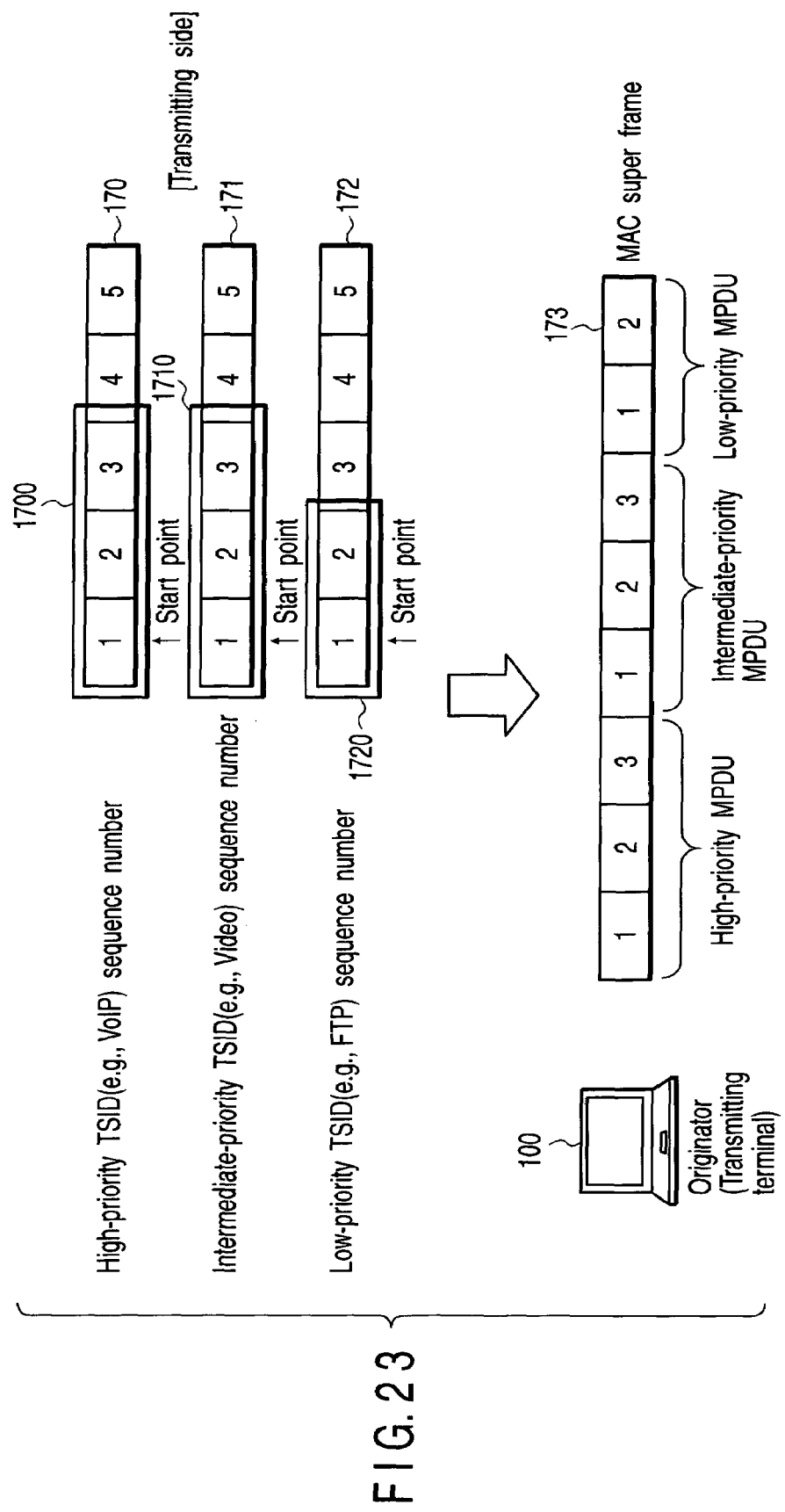
FIG. 23 is a view for explaining an example of sliding window control in retransmission for each priority.

FIG. 23 is a view showing an example of retransmission control for each priority. When MPDUs with different priorities are to be aggregated into a MAC super frame, the transmitting terminal stores in advance the relative positional relationship of the respective priorities in the MAC super frame. This information is required when the terminal performs sliding window control for each priority upon reception of a Partial Ack. Note that the window size of a sliding window is determined for each priority and can be variable in length.

Referring to FIG. 23, reference numeral 170 denotes a frame sequence with a high-priority TSID for VoIP; 171, a frame sequence with an intermediate TSID for Video; and 172, a frame sequence with a low-priority TSID for FTP. As shown in FIG. 23, sliding windows 1700, 1710, and 1702 having start points are set for the respective frame sequences. The frames corresponding to the respective sliding windows 1700, 1710, and 1720 are aggregated to construct a MAC super frame 173 in a transmitting terminal 100.

Figure 24:
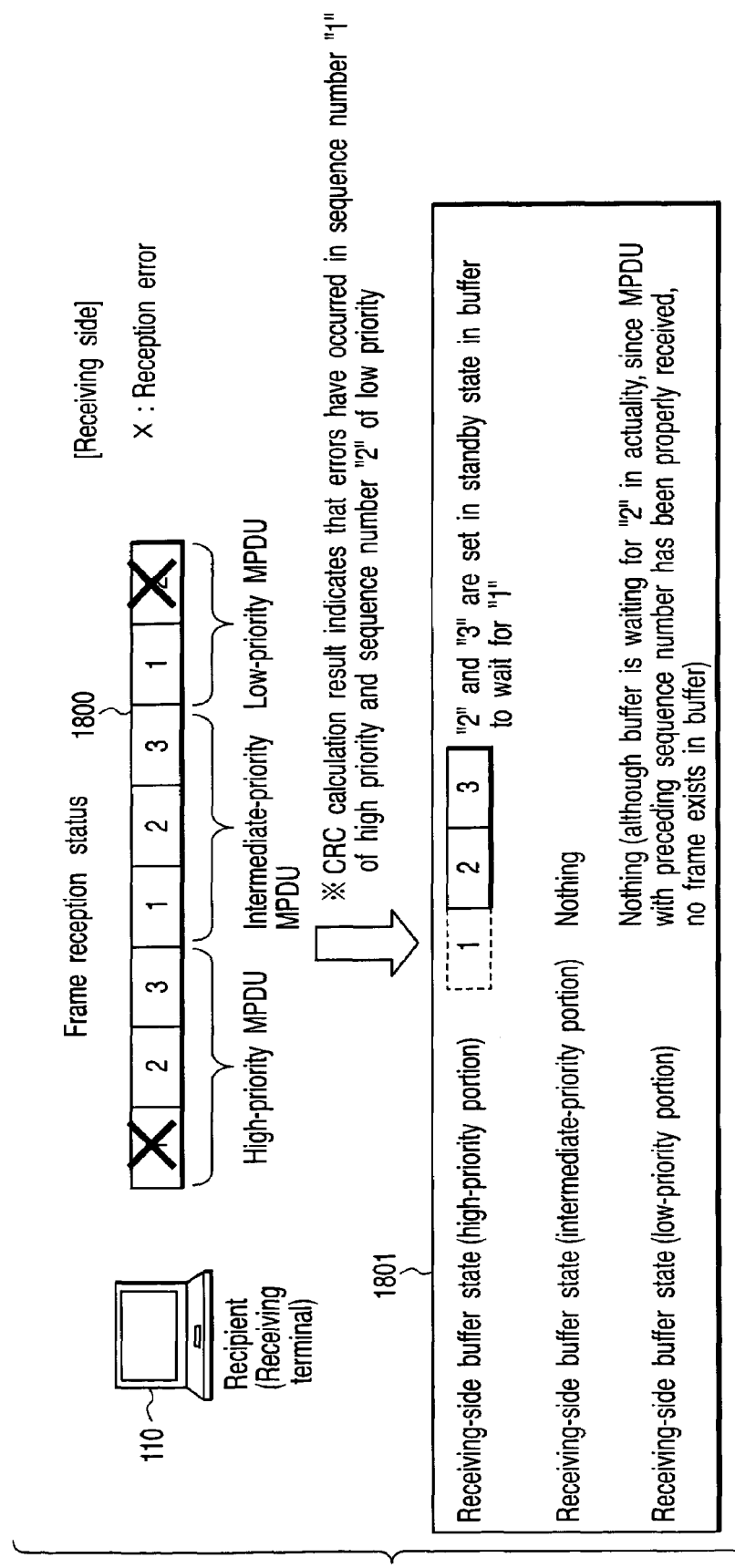
FIG. 24 is another view for explaining an example of sliding window control in retransmission for each priority.

Assume that errors have occurred at "1" of a high-priority MPDU and "2" of a low-priority MPDU as a result of CRC calculation (1800), as shown in FIG. 24. Reference numeral 1801 denotes a receiving-side buffer. At this time, in the receiving-side buffer state corresponding to the high-priority MPDU portion, MPDUs "2" and "3" are set in the standby state to wait for MPDU "1". There are no frames corresponding to the intermediate-priority portion. In the low-priority portion, although MPDU "2" is actually waited for, since the MPDU with the preceding sequence number has been successfully received, no frames are present in the buffer 1801.

On the receiving terminal 110 side, Frames which have not been consecutively received are left in the buffer 1801 to wait for retransmission from the transmitting side. Otherwise, frames are released from a reception buffer 1801 and forwarded to the upper layer.

Figure 25:
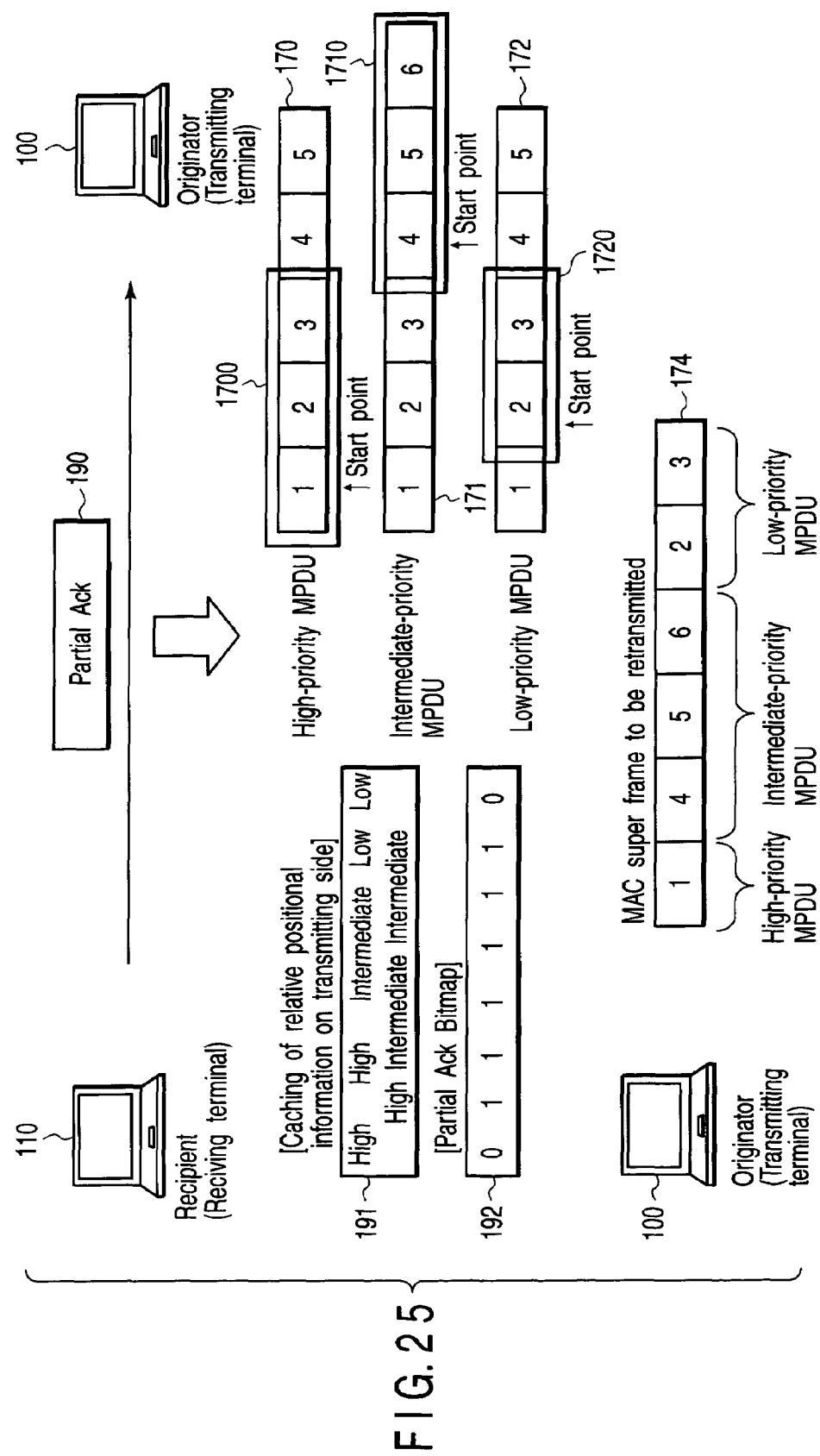
FIG. 25 is still another view for explaining an example of sliding window control in retransmission for each priority.

As shown in FIG. 25, on the receiving side, as in frame aggregation, the reception statuses of the respective MPDUs in the MAC super frame are bitmapped, and a Partial Ack 190 is returned to the transmitting side. When the Partial Ack 190 is returned to the transmitting terminal 100, the transmitting terminal 100 performs sliding window control on the basis of relative positional information 191 of the priority MPDUs which have been cached at the time of the transmission of the MAC super frame. For example, upon referring to a returned Partial Ack Bitmap 192, the transmitting terminal shifts the start point corresponding to each priority, as shown in FIG. 25. When a MAC super frame is to be retransmitted, new frames are aggregated in accordance with the respective start points to construct a MAC super frame 174 to be retransmitted.

As described above, although the maximum window size is determined for each priority, frames with high priorities are preferentially packed into a MAC super frame. When the number of frames aggregated reaches the maximum count (the count depends on the receiver buffer size, and is determined transmitting and receiving side) determined by one PHY frame, if there is no space in which MAC frames with low priorities can be packed, the aggregation of frames into a MAC super frame is immediately abandoned (frames with high priorities are aggregated preferentially over frames with low priorities).

Fourth Embodiment

The fourth embodiment of the present invention is directed to a communication apparatus which transmits many Block Ack control frames (Block Ack Request/Block Ack for each priority) defined in IEEE 802.11e upon containing them in one PHY frame. IEEE 802.11e defines a Block Ack by which data frames are transmitted at SIFS intervals in a burst manner. A communication sequence based on Block Ack can be executed even if the frame aggregation described above is not performed.

Figure 26:
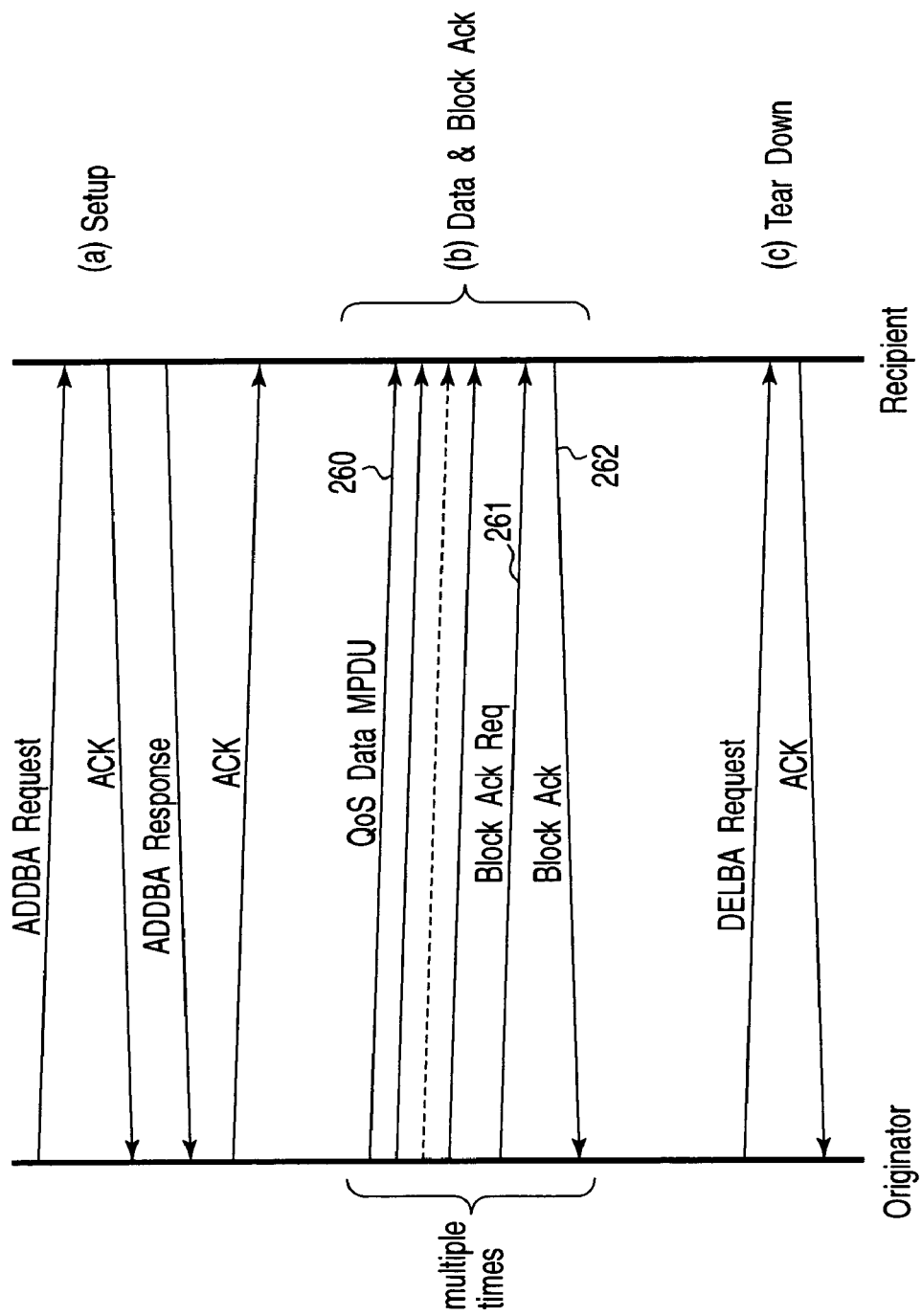
FIG. 26 is a view showing an example of a Block Ack sequence.

FIG. 26 is a view showing an example of a Block Ack sequence. According to a normal sequence, after QoS data 260 is transmitted in a burst manner, a Block Ack Request 261 is sent for each priority, and a Block Ack 262 indicating a reception status is received from the receiving terminal. That is, the Block Ack Request 261 and Block Ack 262 are repeatedly transmitted and received by the number of times corresponding to the number of priorities (e.g. TSs in HCCA protocol).

In contrast to this, in the fourth embodiment, a reduction in excessive overhead is achieved by aggregating Block Ack Requests (or Block Acks) for the respective priorities into one PHY frame.

According to IEEE802.11e standard, a Block Ack Request frame contains BAR control field and Block Ack Starting Sequence Control in addition to the MAC Header. In the BAR Control field, a TID for identifying a priority and a reserved bit are present. The Block Ack Starting Sequence Control field indicates the sequence number of the first MAC frame in the bursty transmission corresponding to priority. That is, the BAR Control and Block Ack Starting Sequence Control fields are information required for each priority.

The frame format of a Block Ack is similar to that of a Block Ack Request but differs in that the Block Ack has a Block Ack Bitmap field containing the bitmap of reception statuses on the receiving terminal side (each status indicating upon CRC calculation for each MAC frame whether or not the frame is successfully received). The information required for each priority includes BAR control, Block Ack Starting Sequence Control, and Block Ack Bitmap fields.

Figure 27:
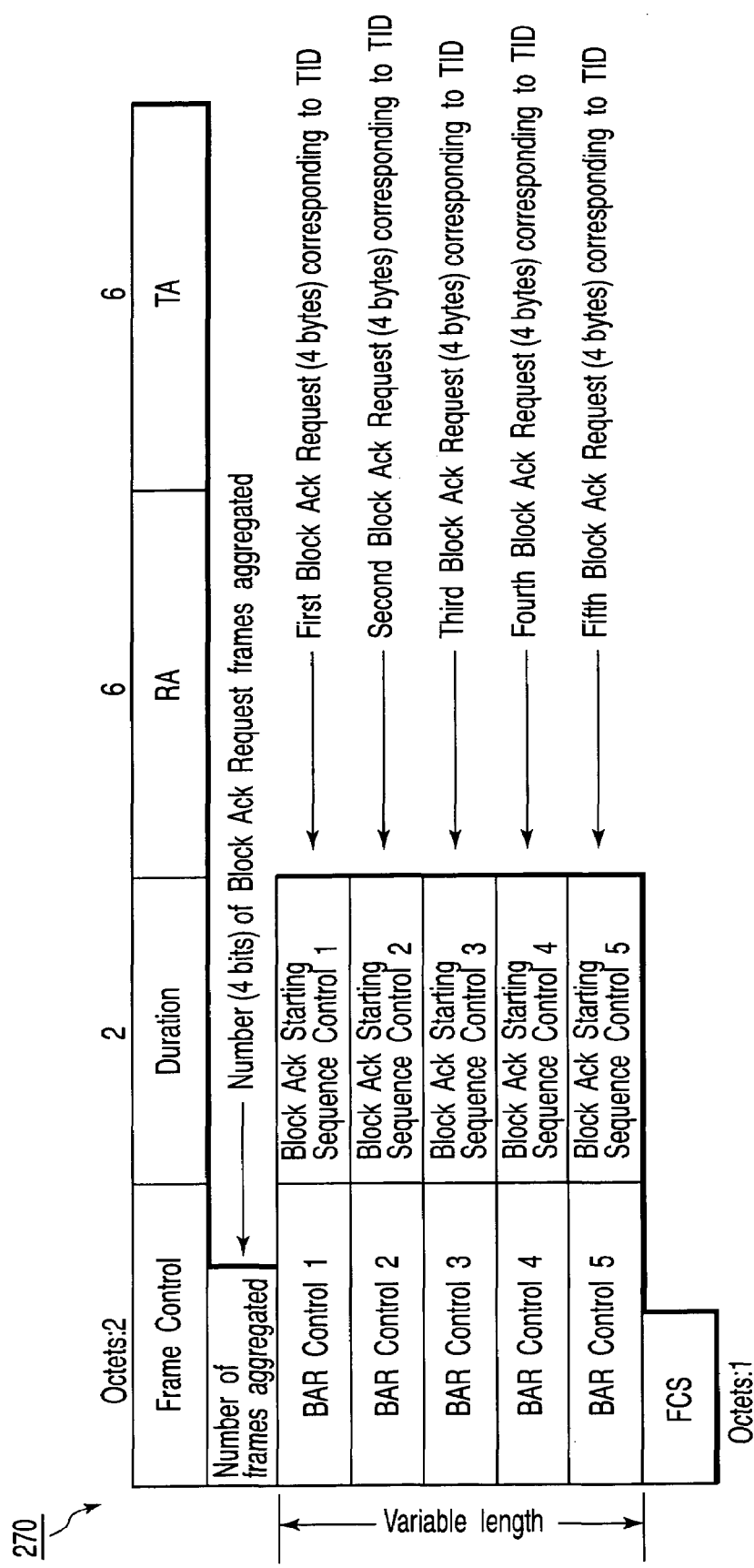
FIG. 27 is a view showing a format in a case wherein block Ack requests for the respective TSs are aggregated into one PHY frame.

As shown in FIG. 27, in this embodiment wherein Block Ack Requests for the respective priorities are aggregated into one PHY frame, an aggregation frame 270 has the following format with a MAC header being located at its head. That is, this format is designed as [MAC Header]—["BAR Control 1", "Block Ack Starting Sequence Control 1"] ["BAR Control 2"], ["Block Ack Starting Sequence Control 2"] ["BAR Control 3", "Block Ack Starting Sequence Control 3"] . . . —[FCS]. In the above frame format, the MAC header and FCS are attached to the Block Ack Request information for each TS.

Figure 28:
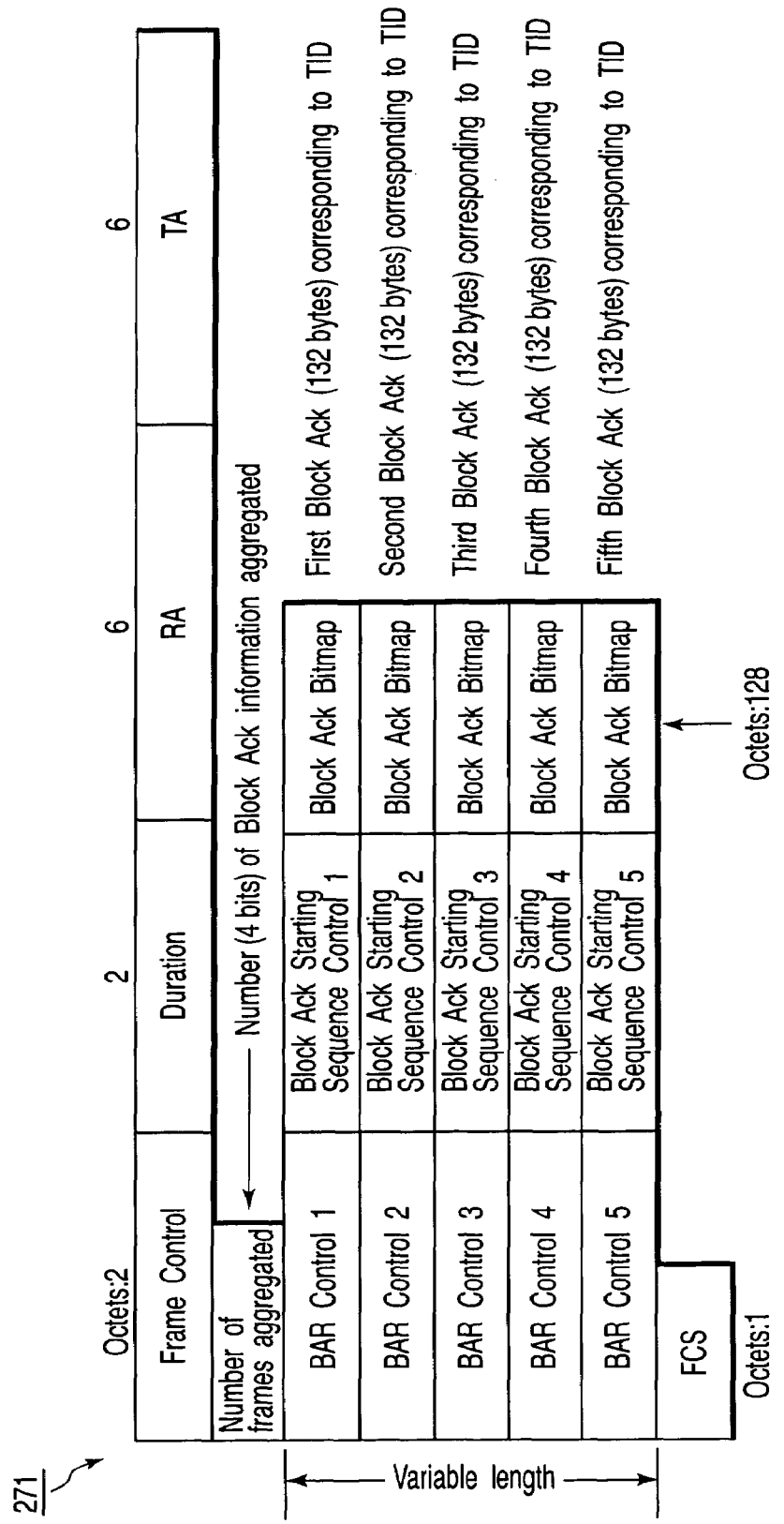
FIG. 28 is a view showing a format in a case wherein Block Ack information for the respective TSs are aggregated into one PHY frame.

When Block Acks for the respective priorities are aggregated into one PHY frame, BAR Control, Block Ack Starting Sequence Control, and Block Ack Bitmap fields are prepared for each priority, with one MAC Header and one FCS being attached. As shown in FIG. 28, an aggregation frame 271 is designed as [MAC Header]—["BAR Control 1", "Block Ack Starting Sequence Control 1", Block Ack Bitmap 1] ["BAR Control 2", "Block Ack Starting Sequence Control 2", Block Ack Bitmap 2] ["BAR Control 3", "Block Ack Starting Sequence Control 3", Block Ack Bitmap_3] . . . —[FCS].

After Block Ack Requests (or Block Acks) are aggregated into one PHY frame in the above manner, Block Ack Starting Sequence Control is performed as in normal IEEE 802.11e. When immediate Block Ack protocol is to be used, the transmitting terminal outputs an aggregated Block Ack Request first, and then waits for the reception of an aggregated Block Ack. Upon receiving the aggregated Block Ack, Block Ack Request the transmitting terminal retransmits QoS data frames in accordance with the respective Block Ack Bitmaps. Assume that Block Ack protocol is to be used. In this case, after an aggregated Block Ack Request is transmitted, the receiving terminal transmits a Normal Ack frame for the Block Ack Request, and transmits an aggregated Block Acks after certain period of time. The transmitting terminal transmits an a Normal Ack frame corresponding to the Block Ack frame received from the receiving side, and begins a retransmission process.

Figure 29:
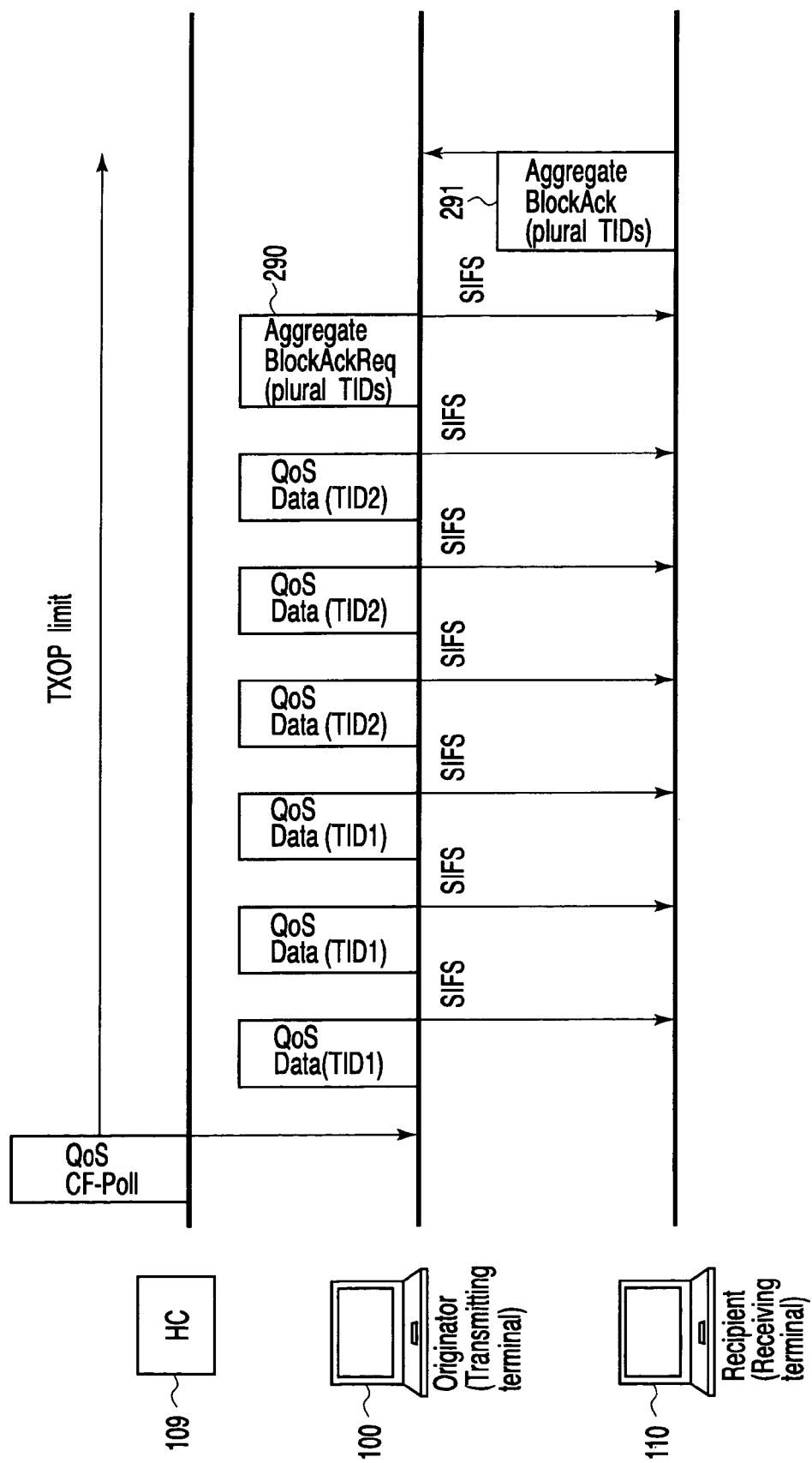
FIG. 29 is a view showing an example of a immediate Block Ack frame sequence.

FIG. 29 shows an example of the frame sequence of a immediate Block Ack. The immediate Block Ack is a sequence in which after the transmitting side transmits a Block Ack Request, the receiving side immediately returns a response (Block Ack). In this sequence, Block Ack Request and Block Ack for each plurality of priorities (strictly speaking TIDs) are combined, and an aggregate Block Ack Request 290 and an aggregated Block Ack 291 are used. Referring to FIG. 29, TXOP signifies the interval of time when a particular terminal has the right to frame exchange sequences onto the wireless medium. Also, QoS CF-Poll (Contention Free-Poll) means a QoS compatible polling frame transmitted by the HC 109 to permit a QSTA 100 to perform transmission. At the time of downlink transmission from the HC 109, no QoS CF-Poll frame is required.

Figure 30:
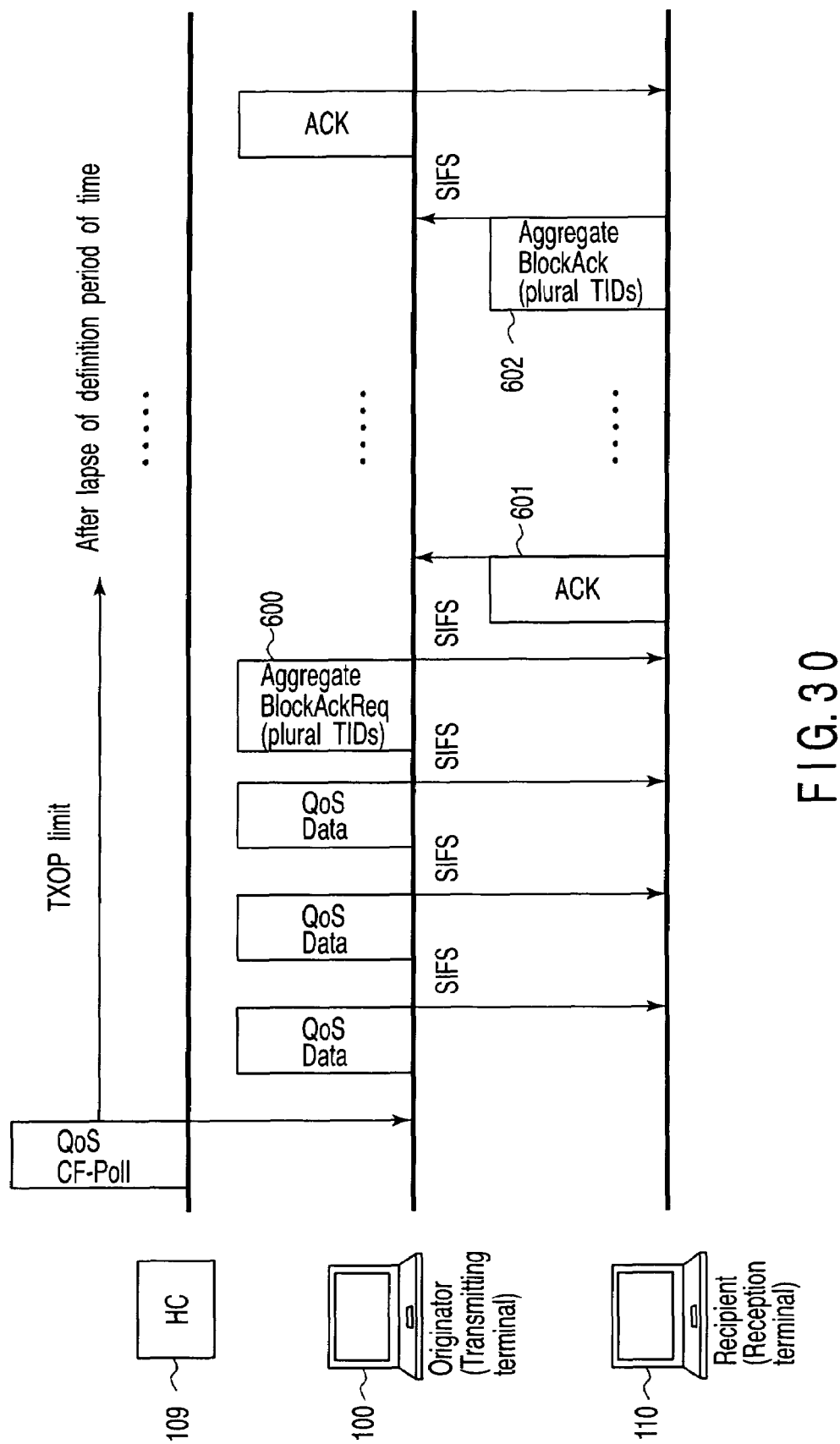
FIG. 30 is a view showing an example of a delayed Block Ack frame sequence.

The delayed Block Ack sequence shown in FIG. 30 is a delayed type sequence in which when the transmitting side transmits a Block Ack Request, the receiving side returns a response (Block Ack) after a while. In the delayed Block Ack sequence, a Normal Ack frame 601 is required for each of Block Ack Request and Block Ack. As shown in FIG. 30, in the delayed Block Ack sequence, an aggregate Block Ack Request 600 and aggregate Block Ack 602 are used.

According to the fourth embodiment, there can be provided a communication apparatus which transmits Block Ack Request or response messages defined for the respective TIDs by using one PHY frame (aggregates Block Ack messages).

The above embodiments of the present invention described above can provide functions and effects such as being capable of guaranteeing the quality of an application sensitive to delays and, for example, keeping jitter uniform and realizing more efficient transfer (guaranteeing even a bandwidth for low-priority flows) by aggregating a plurality of flows corresponding to one destination. In addition, assigning weights for the respective destination STAs (users) makes it possible to easily realize service quality classification based on an accounting system. This makes it possible to cause an AP to transmit a frame preferentially, by WRR, to the terminal of a user who pays a high fee.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus comprising:
a receiving device configured to receive a physical frame containing a plurality of MAC frames with different traffic identifiers, for said each MAC frame, which includes a traffic identifier field;
a response generating device configured to generate a MAC frame including:
 a MAC header;
 a first starting sequence control corresponding to a first traffic identifier;
 a first acknowledgement bitmap corresponding to the first identifier, the first acknowledgement bitmap indicating first reception statuses for one or more of the MAC frames corresponding to the first traffic identifier;
 a second starting sequence control corresponding to a second traffic identifier;
 a second acknowledgement bitmap corresponding to the second traffic identifier, the second acknowledgement bitmap indicating second reception statuses for one or more of the MAC frames corresponding to the second traffic identifier; and
 a frame check sequence (FCS); and
a response transmitting device configured to transmit a physical frame containing the MAC frame generated by the response generating device.

2. A communication method comprising:
receiving a physical frame containing a plurality of MAC frames with different traffic identifiers;
generating a MAC frame including:
 a MAC header;
 a first starting sequence control corresponding to a first traffic identifier;
 a first acknowledgement bitmap corresponding to the first traffic identifier, the first acknowledgement bitmap indicating first reception statuses for one or more of the MAC frames corresponding to the first traffic identifier;
 a second starting sequence control corresponding to a second traffic identifier;
 a second acknowledgement bitmap corresponding to the second traffic identifier, the second acknowledgement bitmap indicating second reception statuses for one or more of the MAC frames corresponding to the second traffic identifier; and
 a frame check sequence (FCS); and
transmitting a physical frame containing the MAC frame generated in the generating step.

3. A communication apparatus comprising:
a data receiving device configured to receive a series of QoS data corresponding to a plurality of traffic identifiers;
a control frame receiving device configured to receive a single control frame containing a plurality of Block Ack Requests corresponding to said plurality of traffic identifiers; and
a response generating device configured to generate a single response frame containing a plurality of Block Acks corresponding to said plurality of Block Ack Requests in response to the control frame, wherein the response frame is a MAC frame including:
 a MAC header;
 a first starting sequence control corresponding to a first traffic identifier;
 a first Block Ack bitmap corresponding to the first traffic identifier, the first Block Ack bitmap indicating first reception statuses for one or more of the series of QoS data corresponding to the first traffic identifier;
 a second starting sequence control corresponding to a second traffic identifier;
 a second Block Ack bitmap corresponding to the second traffic identifier, the second Block Ack bitmap indicating second reception statuses for one or more of the series of QoS data corresponding to the second traffic identifier; and
 a frame check sequence (FCS).

4. An apparatus according to claim 3, wherein an immediate response sequence of transmitting the response frame within a polled period is executed.

5. An apparatus according to claim 4, wherein a delayed response sequence of transmitting the response frame after a predetermined period in a polled period is executed.

6. A communication method comprising:
receiving a series of QoS data corresponding to a plurality of traffic identifiers;
receiving a single control frame containing a plurality of Block Ack Requests corresponding to said plurality of traffic identifiers; and
generating a single control response frame containing a plurality of Block Acks corresponding to said plurality of Block Ack Requests in response to the control frame, wherein the response frame is a MAC frame including:
 a MAC header;

a first starting sequence control corresponding to a first traffic identifier;

a first Block Ack bitmap corresponding to the first traffic identifier, the first Block Ack bitmap indicating first reception statuses for one or more of the series of QoS data corresponding to the first traffic identifier;

a second starting sequence control corresponding to a second traffic identifier;

a second Block Ack bitmap corresponding to the second traffic identifier, the second Block Ack bitmap indicating second reception statuses for one or more of the series of QoS data corresponding to the second traffic identifier; and a frame check sequence (FCS).

7. A method according to claim 6, wherein an immediate response sequence of transmitting the response frame within a polled period is executed.

8. A method according to claim 6, wherein a delayed response sequence of transmitting the response frame after a predetermined period in a polled period is executed.

9. A communication system comprising:

a first communication apparatus including a data transmitting device configured to transmit a series of QoS data corresponding to a plurality of traffic identifiers, and a control frame transmitting device configured to transmit a single control frame containing a plurality of Block Ack Requests corresponding to said plurality of traffic identifiers; and a second communication apparatus including a data receiving device configured to receive a series of QoS data corresponding to a plurality of traffic identifiers, a control frame receiving device configured to receive a single control frame containing a plurality of Block Ack Requests corresponding to said plurality of traffic identifiers, and a response transmitting device configured to transmit, to the first communication apparatus, a single response frame containing a plurality of Block Acks corresponding to said plurality of Block Ack Requests in response to the control frame, wherein the response frame is a MAC frame including:

a MAC header;

a first starting sequence control corresponding to a first traffic identifier;

a first Block Ack bitmap corresponding to the first traffic identifier, the first Block Ack bitmap indicating first reception statuses for one or more of the series of QoS data corresponding to the first traffic identifier;

a second starting sequence control corresponding to a second traffic identifier;

a second Block Ack bitmap corresponding to the second traffic identifier, the second Block Ack bitmap indicating second reception statuses for one or more of the series of QoS data corresponding to the second traffic identifier; and a frame check sequence (FCS).

* * * * *